United States Patent
Wu

(10) Patent No.: US 11,963,211 B2
(45) Date of Patent: Apr. 16, 2024

(54) RADIO RESOURCE CONFIGURATION METHOD, BASE STATION AND USER EQUIPMENT

(71) Applicant: VIVO MOBILE COMMUNICATION CO., LTD., Guangdong (CN)

(72) Inventor: Yumin Wu, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 412 days.

(21) Appl. No.: 16/754,360

(22) PCT Filed: Sep. 11, 2018

(86) PCT No.: PCT/CN2018/104957
§ 371 (c)(1),
(2) Date: Apr. 7, 2020

(87) PCT Pub. No.: WO2019/080654
PCT Pub. Date: May 2, 2019

(65) Prior Publication Data
US 2020/0314862 A1    Oct. 1, 2020

(30) Foreign Application Priority Data

Oct. 27, 2017   (CN) .......................... 201711025728.X

(51) Int. Cl.
*H04W 72/54*   (2023.01)
*H04W 28/02*   (2009.01)

(52) U.S. Cl.
CPC ....... *H04W 72/54* (2023.01); *H04W 28/0268* (2013.01)

(58) Field of Classification Search
CPC .......................... H04W 72/08; H04W 28/0268
See application file for complete search history.

(56) References Cited

U.S. PATENT DOCUMENTS

| 2015/0223093 A1 | 8/2015 | Zhang et al. | |
|---|---|---|---|
| 2017/0079059 A1* | 3/2017 | Li | H04W 16/02 |
| 2019/0007291 A1* | 1/2019 | Yi | H04W 24/08 |

FOREIGN PATENT DOCUMENTS

| CN | 102740379 B | * 12/2016 | ............ H04W 28/06 |
|---|---|---|---|
| CN | 106454921 A |   2/2017 | |

(Continued)

OTHER PUBLICATIONS

CN Office Action in Application No. 201711025728.X dated Mar. 24, 2021.

*Primary Examiner* — Rhonda L Murphy
(74) *Attorney, Agent, or Firm* — Price Heneveld LLP

(57) ABSTRACT

A radio resource configuration method, a base station and a UE are provided. The radio resource configuration method includes: acquiring an arrival time of each data packet; acquiring a delivery time or a reception time of each data packet; calculating an average delay of downlink data packets within a time period or a proportion of uplink data packets whose reordering delay at a PDCP layer within a time period is greater than or smaller than a predetermined delay threshold, the average delay of the downlink data packets including one or more of average delays of the downlink data packets for a same UE, of a same bearer type, through a same transmission path, on a same RB and in a same QoS flow within the time period; and performing radio resource configuration based on the calculated average delay or the calculated proportion.

16 Claims, 10 Drawing Sheets

(56) References Cited

FOREIGN PATENT DOCUMENTS

| CN | 106792723 A | | 5/2017 | | |
|---|---|---|---|---|---|
| CN | 106921996 A | | 7/2017 | | |
| GB | 2525935 A | * | 11/2015 | ............ | H04L 43/00 |
| WO | WO-2017073900 A1 | * | 5/2017 | ............ | H04W 24/10 |

* cited by examiner

RADIO RESOURCE CONFIGURATION METHOD, BASE STATION AND USER EQUIPMENT

CROSS-REFERENCE TO RELATED APPLICATION

The present application is the U.S. national phase of PCT Application No. PCT/CN2018/104957 filed on Sep. 11, 2018, which claims a priority of the Chinese patent application No. 201711025728.X filed on Oct. 27, 2017, which is incorporated herein by reference in its entirety.

TECHNICAL FIELD

The present disclosure relates to the field of communication technology, in particular to a radio resource configuration method, a base station and a User Equipment (UE).

BACKGROUND

Various bearers have been introduced into a $5^{th}$-Generation (5G) communication system, e.g., a Master Cell Group (MCG) bearer, a Secondary Cell Group (SCG) bearer, a split bearer, a duplicate bearer, and so on. In addition, a preprocessing function and a Service Data Adaptation Protocol (SDAP) have been introduced into the 5G communication system, and the reordering of data arriving in an erroneous order is supported by a Packet Data Convergence Protocol (PDCP) layer in the 5G communication system. Due to these new functions, when a conventional radio resource configuration mode is still adopted by the 5G communication system, the performance of the 5G communication system may be adversely affected.

SUMMARY

In one aspect, the present disclosure provides in some embodiments a radio resource configuration method for a base station, including: acquiring an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at a Radio Link Control (RLC) layer, or a time when the data packet arrives at a Media Access Control (MAC) layer; acquiring a delivery time or a reception time of each data packet, the delivery time being a time when the data packet is transmitted from the PDCP layer to a high-layer protocol entity, and the reception time being a time when the data packet has been received successfully; calculating an average delay of downlink data packets within a certain time period or a proportion of uplink data packets whose reordering delay at the PDCP layer is greater than or smaller than a predetermined delay threshold within a certain time period based on the arrival time and the delivery time or the reception time, the average delay of the downlink data packets including one or more of the average delay of the downlink data packets for a same UE within a certain time period, the average delay of the downlink data packets of a same bearer type within a certain time period, the average delay of the downlink data packets transmitted through a same transmission path within a certain time period, the average delay of the downlink data packets transmitted on a same Radio Bearer (RB) within a certain time period, and the average delay of the downlink data packets for a same Quality of Service (QoS) flow within a certain time period; and performing radio resource configuration based on the calculated average delay or proportion.

In another aspect, the present disclosure provides in some embodiments a radio resource configuration method for a base station, including: acquiring an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer; acquiring a delivery time or a reception time of each data packet, the delivery time being a time when the data packet is transmitted from the PDCP layer to a high-layer protocol entity, and the reception time being a time when the data packet has been received successfully; calculating an average delay of downlink data packets within a certain time period or a proportion of uplink data packets whose reordering delay at the PDCP layer is greater than or smaller than a predetermined delay threshold within a certain time period based on the arrival time and the delivery time or the reception time, the average delay of the downlink data packets including one or more of the average delay of the downlink data packets for a same UE within a certain time period, the average delay of the downlink data packets of a same bearer type within a certain time period, the average delay of the downlink data packets transmitted through a same transmission path within a certain time period, the average delay of the downlink data packets transmitted on a same RB within a certain time period, and the average delay of the downlink data packets for a same QoS flow within a certain time period; and performing radio resource configuration based on the calculated average delay or proportion.

In yet another aspect, the present disclosure provides in some embodiments a radio resource configuration method for a UE, including: acquiring an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer; acquiring a delivery time of each data packet, the delivery time being a time when the data packet is transmitted from the PDCP layer to a high-layer protocol entity, a time when the data packet is transmitted to a physical layer PHY, a time when the data packet is transmitted through an air interface, or a time when a feedback of the data packet has been received successfully; calculating a proportion of data packets whose delay is greater than or smaller than a predetermined delay threshold within a certain time period based on the arrival time and the delivery time, the delay of the data packets including a reordering delay of downlink data packets at the PDCP layer or a delivery delay of uplink data packets, the proportion including one or more of a proportion in data packets for the UE, a proportion in data packets on a same RB, a proportion in data packets for a same QoS flow, a proportion in data packets received on a same split bearer and through a same path, a proportion in data packets received on a same duplicate bearer and through a same path, a proportion in data packets for a same cell group, and a proportion in data packets of a same bearer type; and transmitting the calculated proportion to a base station, so that the base station performs the radio resource configuration based on the proportion.

In still yet another aspect, the present disclosure provides in some embodiments a base station, including: a first acquisition module configured to acquire an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer; a second acquisition module configured to acquire a delivery time or a reception time of each data packet, the delivery time being a time when the data packet is transmitted from the PDCP layer to a high-layer protocol entity, and the reception time being a time when the data packet has been received successfully; a calculation module configured to calculate an average delay of downlink data packets within a certain time period or a proportion of uplink data packets whose reordering delay at the PDCP layer is greater than or smaller than a predetermined delay threshold within a certain time period based on the arrival time and the delivery time or the reception time, the average delay of the downlink data packets including one or more of the average delay of the downlink data packets for a same UE within a certain time period, the average delay of the downlink data packets of a same bearer type within a certain time period, the average delay of the downlink data packets transmitted through a same transmission path within a certain time period, the average delay of the downlink data packets transmitted on a same RB within a certain time period, and the average delay of the downlink data packets for a same QoS flow within a certain time period; and a configuration module configured to perform radio resource configuration based on the calculated average delay or proportion.

In still yet another aspect, the present disclosure provides in some embodiments a UE, including: a first acquisition module configured to acquire an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer; a second acquisition module configured to acquire a delivery time of each data packet, the delivery time being a time when the data packet is transmitted from the PDCP layer to a high-layer protocol entity, a time when the data packet is transmitted to a physical layer PHY, a time when the data packet is transmitted through an air interface, or a time when a feedback of the data packet has been received successfully; a calculation module configured to calculate a proportion of data packets whose delay is greater than or smaller than a predetermined delay threshold within a certain time period based on the arrival time and the delivery time, the delay of the data packets including a reordering delay of downlink data packets at the PDCP layer or a delivery delay of uplink data packets, the proportion including one or more of a proportion in data packets for the UE, a proportion in data packets on a same RB, a proportion in data packets for a same QoS flow, a proportion in data packets received on a same split bearer and through a same path, a proportion in data packets received on a same duplicate bearer and through a same path, a proportion in data packets for a same cell group, and a proportion in data packets of a same bearer type; and a transmission module configured to transmit the calculated proportion to a base station, so that the base station performs the radio resource configuration based on the proportion.

In still yet another aspect, the present disclosure provides in some embodiments a base station, including a memory, a processor, and a computer program stored in the memory and executed by the processor. The processor is configured to execute the computer program so as to implement the above-mentioned radio resource configuration method for the base station.

In still yet another aspect, the present disclosure provides in some embodiments a UE, including a memory, a processor, and a computer program stored in the memory and executed by the processor. The processor is configured to execute the computer program so as to implement the above-mentioned radio resource configuration method for the UE.

In still yet another aspect, the present disclosure provides in some embodiments a computer-readable storage medium storing therein a computer program. The computer program is executed by a processor so as to implement the above-mentioned radio resource configuration method for the base station, or the above-mentioned radio resource configuration method for the UE.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
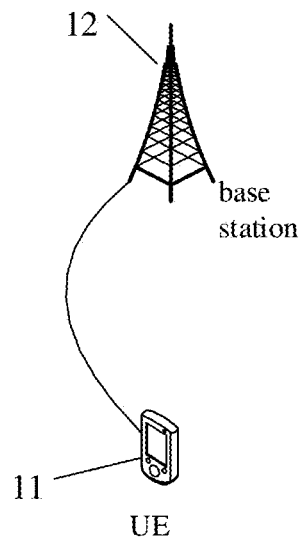
FIG. 1 is a schematic view showing a radio resource configuration system according to one embodiment of the present disclosure.

FIG. 1 shows a radio resource configuration system. As shown in FIG. 1, the system includes a UE 11 and a base station 12. The UE 11 may be, e.g., a mobile phone, a tablet personal computer, a laptop computer, a Personal Digital Assistant (PDA), a Mobile Internet Device (MID) or a wearable device. It should be appreciated that, the type of the UE will not be particularly defined herein. The base station 12 may be a 5G base station (e.g., gNB, 5G New Radio (NR) Node B (NB)). It should be appreciated that, the type of the base station will not be particularly defined herein.

It should be appreciated that, functions of the UE 11 and the base station 12 will be described hereinafter in conjunction with the embodiments.

In addition, in the embodiments of the present disclosure, the UE 11 and the base station 12 may each support Dual Connectivity (DC) architecture including two cell groups, i.e., an MCG and an SCG, and support a DPCP duplication function, so as to generate the following different bearer types.

Figure 2:
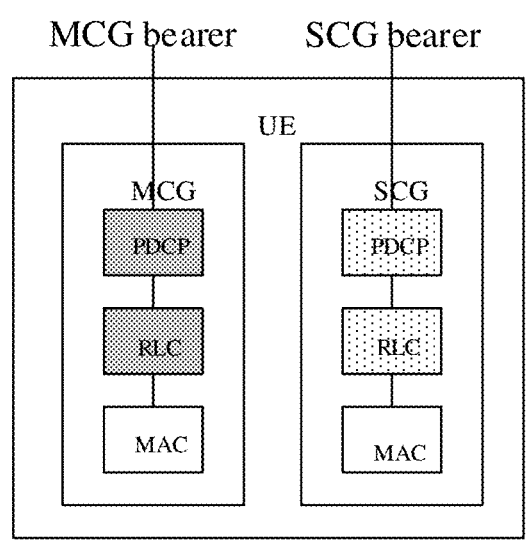
FIG. 2 is a schematic view showing a bearer type according to one embodiment of the present disclosure.

MCG bearer: a PDCP entity, an RLC entity and an MAC entity corresponding to the MCG bearer, as shown in FIG. 2.

SCG bearer: a PDCP entity, an RLC entity and an MAC entity corresponding to the SCG bearer, as shown in FIG. 2.

Figure 3:
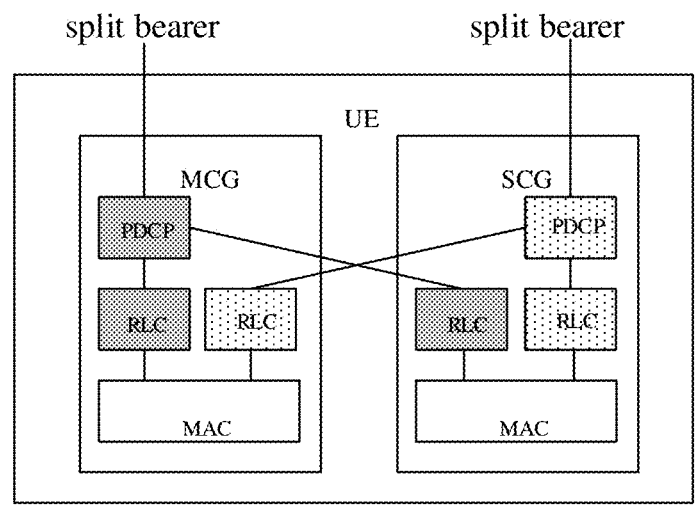
FIG. 3 is a schematic view showing another bearer type according to one embodiment of the present disclosure.

Split bearer: a PDCP entity corresponding to the split bearer is located in one cell group, and two RLC entities and two MAC entities corresponding to the split bearer are located in different cell groups, as shown in FIG. 3.

Figure 4:
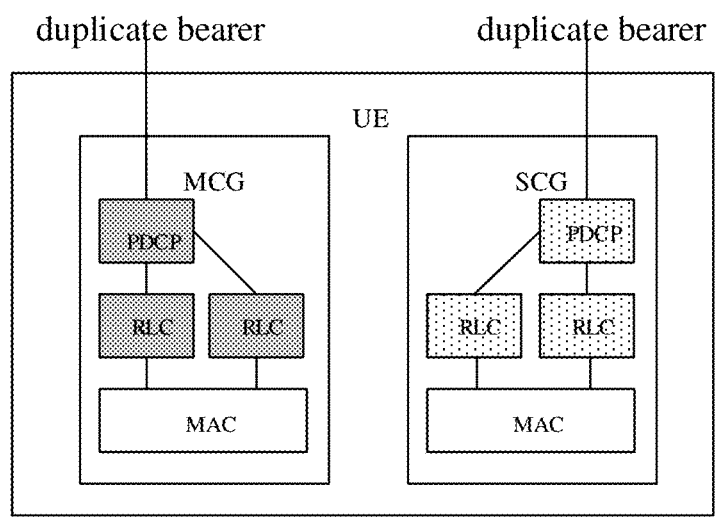
FIG. 4 is a schematic view showing yet another bearer type according to one embodiment of the present disclosure.

Duplicate bearer: one PDCP entity, two RLC entities and one MAC entity corresponding to the duplicate bearer are located in one cell group, as shown in FIG. 4.

In FIGS. 2 and 4, the architecture for the UE is taken as an example.

Figure 5:
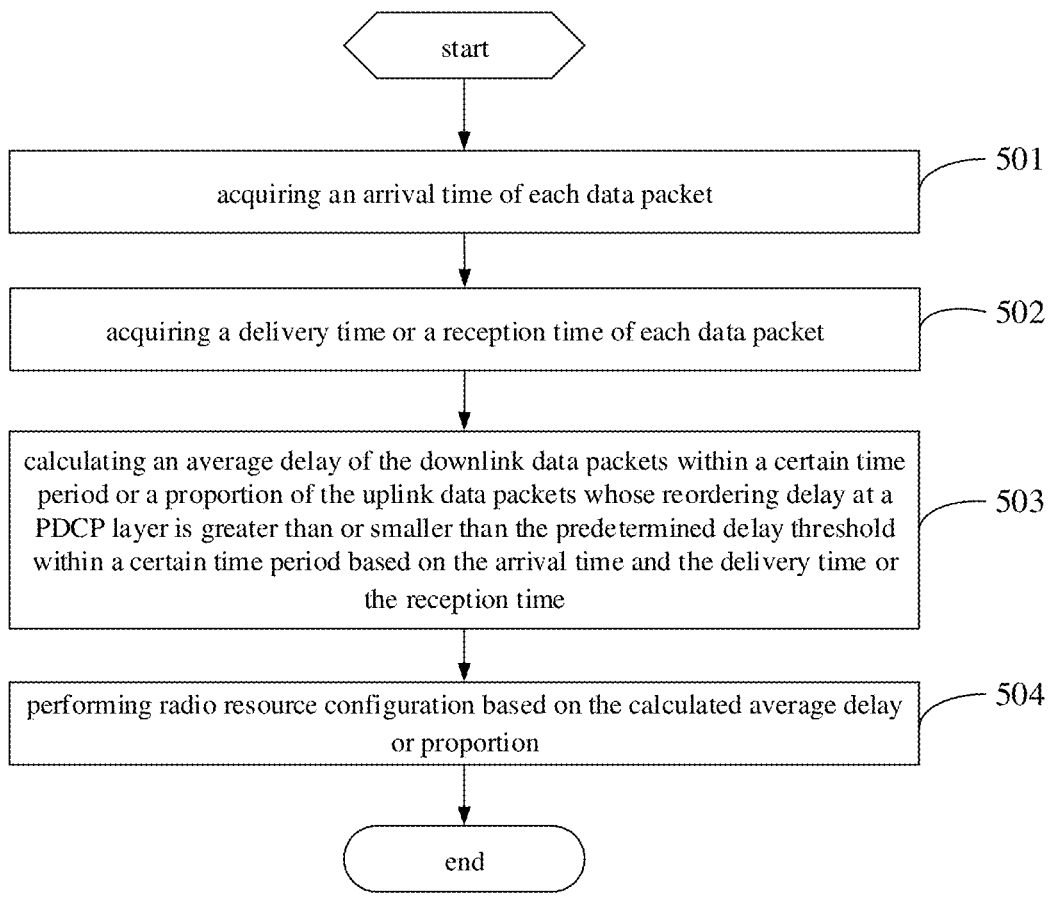
FIG. 5 is a flow chart of a radio resource configuration method according to one embodiment of the present disclosure.

The present disclosure provides in some embodiments a radio resource configuration method applied for a base station which, as shown in FIG. 5, includes the following steps.

Step 501: acquiring an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer.

Each data packet may be a downlink data packet or an uplink data packet. In addition, during the calculation of an average delay of the downlink data packets, the arrival time may include the time when the data packet arrives at the SDAP layer, the time when the data packet arrives at the PDCP layer, the time when the data packet arrives at the RLC layer, or the time when the data packet arrives at the MAC layer. During the calculation of a proportion of the uplink data packets whose reordering delay at the PDCP layer is greater than or smaller than a predetermined delay threshold, the arrival time may include the time when the data packet arrives at the PDCP layer or the time when the data packet arrives at the PDCP layer and is placed into the reordering window.

Step 502: acquiring a delivery time or a reception time of each data packet, the delivery time being a time when the data packet is transmitted from the PDCP layer to a high-layer protocol entity, and the reception time being a time when the data packet has been received successfully.

During the calculation of the average delay of the downlink data packets, Step 502 may include acquiring the reception time of each data packet, and during the calculation of the proportion of the uplink data packets whose reordering delay at the PDCP layer is greater than or smaller than the predetermined delay threshold, Step 502 may include acquiring the delivery time of each data packet. The time when the data packet has been received successfully may be understood as a time when a feedback has been received successfully from a UE.

In addition, the high-layer protocol entity may be a protocol entity in a protocol stack higher than the PDCP layer.

Step 503: calculating an average delay of the downlink data packets within a certain time period or a proportion of the uplink data packets whose reordering delay at the PDCP layer is greater than or smaller than the predetermined delay threshold within a certain time period based on the arrival time and the delivery time or the reception time, the average delay of the downlink data packets including within a certain time period, one or more of the average delay of the downlink data packets by a same UE, in a same bearer type, in a same transmission path, on a same RB, and in a same QoS flow.

Step 503 may be understood as calculating the average delay of the downlink data packets within a certain time period based on the arrival time and the reception time, or calculating the proportion of the uplink data packets whose reordering delay at the PDCP layer is greater than or smaller than the predetermined delay threshold within a certain time period based on the arrival time and the delivery time.

In addition, in the embodiments of the present disclosure, the average delay of the downlink data packets may be understood as an average delivery delay of the downlink data packets. The average delivery delay may be an average value of differences between the arrival time and the reception time (i.e., the time when the feedback has been received from the UE successfully) of each downlink data packet within a certain time period.

It should be appreciated that, the data packet in Steps 501 and 502 may be any data packet within the time period. In the embodiments of the present disclosure, each data packet within the time period may refer to that mentioned in Steps 501 and 502, and thus will not be particularly defined herein. To be specific, a delivery delay of each uplink data packet within the time period may be calculated so as to calculate the average delay of the downlink data packets within a certain time period, or the reordering delay of each downlink data packet at the PDCP layer within the time period may be calculated so as to calculate the proportion of the uplink data packets whose reordering delay at the PDCP layer is greater than or smaller than the predetermined delay threshold within a certain time period.

In addition, the average delay of the downlink data packets received by the same UE within a certain time period may be an average delivery delay of the downlink data packets for the same UE within the time period. The average delay of the downlink data packets of the same bearer type within a certain time period may be an average delivery delay of the downlink data packets of a certain bearer type (e.g., the MCG bearer, the SCG bearer, the split bearer or the duplicate bearer). The average delay of the downlink data packets transmitted on the same RB within a certain time period may be an average delivery delay of the downlink data packets received on a certain RB within the time period. The average delay of the downlink data packets for a same QoS flow within a certain time period may be an average delivery delay of the downlink data packets for a certain QoS flow within the time period.

It should be appreciated that, in the embodiments of the present disclosure, an average delivery delay of the downlink data packets with a same QoS Class Identifier (QCI) may also be calculated.

Step 504: performing radio resource configuration based on the calculated average delay or proportion.

When the delivery delay of the downlink data packet for one UE is greater than the predetermined delay threshold, the base station may quickly schedule the downlink data transmission for the UE, so as to reduce the delivery delay of the data packets for the UE. For another example, when the delivery delay of the downlink data packet for one UE is smaller than the predetermined delay threshold and the downlink data packets are being transmitted to the UE, the base station may preferentially schedule the downlink data transmission for the other UEs, so as to reduce the downlink delivery delay for the other UEs while appropriately increasing the downlink delivery delay of the UE, thereby to reduce the delivery delay of the data packets in the entire network.

When the reordering delay of the uplink data packets from one UE at the PDCP layer is greater than the predetermined delay threshold, the base station may set a smaller value for a reordering timer, so as to reduce the reordering delay of the uplink data packets from the UE at the PDCP layer. For another example, when the reordering delay of the uplink data packets from one UE at the PDCP layer is smaller than the predetermined delay threshold, the base station may set a larger value for the reordering timer, so as to reduce the quantity of the uplink data packets discarded due to the expiration of the reordering timer while appropriately increasing the delivery delay of the uplink data from the UE.

It should be appreciated that, the above examples are merely for illustrative purposes, and in the embodiments of the present disclosure, the radio resource configuration will not be particularly defined. Through the above steps, it is able to reduce the delivery delay at the UE.

In the embodiments of the present disclosure, the arrival time of each data packet may be acquired, and the arrival time may include the time when the data packet arrives at the SDAP layer, the time when the data packet arrives at the PDCP layer, the time when the data packet arrives at the PDCP layer and is placed into the reordering window, the time when the data packet arrives at the RLC layer, or the time when the data packet arrives at the MAC layer. Next, the delivery time or the reception time of each data packet may be acquired, the delivery time may be the time when the data packet is transmitted from the PDCP layer to the high-layer protocol entity, and the reception time may be the time when the data packet has been received successfully. Next, the average delay of the downlink data packets within a certain time period or the proportion of the uplink data packets whose reordering delay at the PDCP layer is greater than or smaller than the predetermined delay threshold within a certain time period may be calculated based on the arrival time and the delivery time or the reception time, and the average delay of the downlink data packet may include within a certain time period, one or more of the average delay of the downlink data packets by the same UE, in a same bearer type, in a same transmission path, on a same RB and in a same Qos flow. Then, the radio resource configuration may be performed based on the calculated average delay or proportion. As a result, it is able to acquire, through calculation, the delay adapted to the functions introduced into the 5G communication system, and perform the radio resource configuration based on the calculated delay, thereby to improve the performance of the communication system and further reduce the delivery delay of the data packets in the network.

Figure 6:
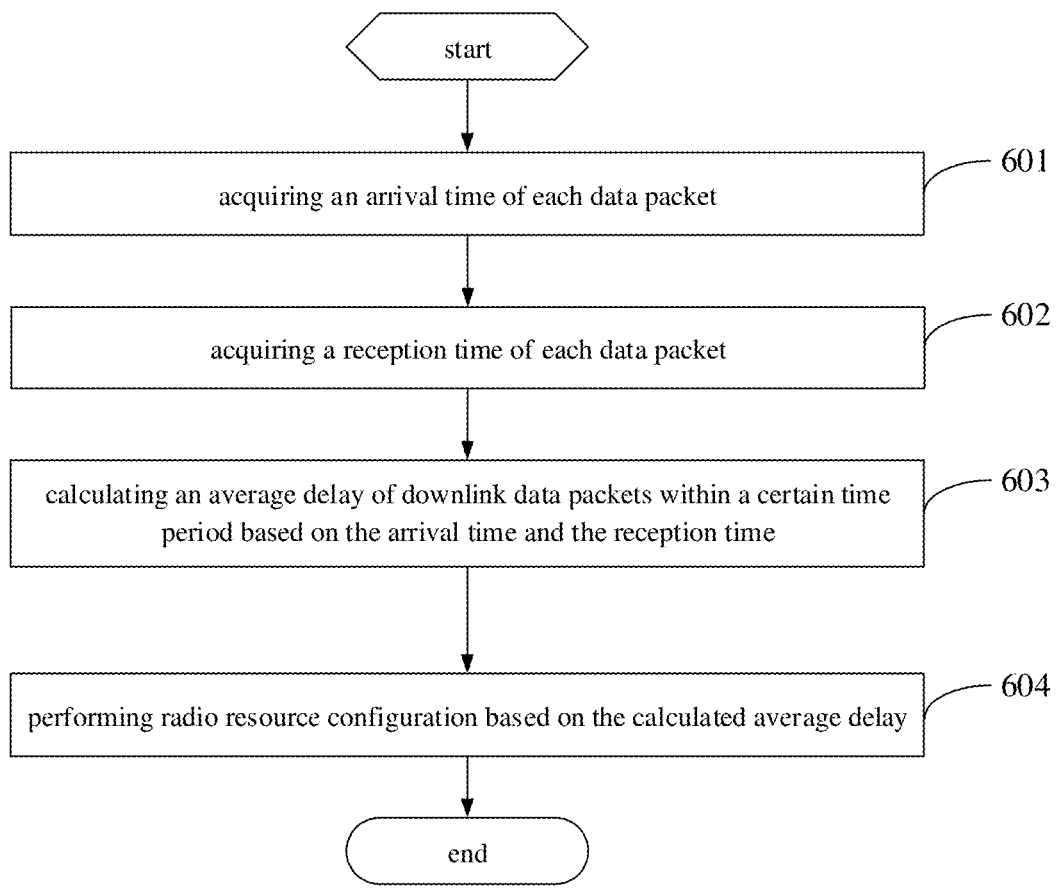
FIG. 6 is another flow chart of the radio resource configuration method according to one embodiment of the present disclosure.

As shown in FIG. 6, the radio resource configuration method may include the following steps.

Step 601: acquiring the arrival time of each data packet, the arrival time including the time when the data packet arrives at the SDAP layer, the time when the data packet arrives at the PDCP layer, the time the data packet arrives at the RLC layer, or the time when the data packet arrives at the MAC layer.

In the embodiments of the present disclosure, the data packet may be a downlink data packet. In Step 601, the time when each downlink data packet arrives at the SDAP layer, the time when each downlink data packet arrives at the PDCP layer, the time when each downlink data packet arrives at the RLC layer or the time when each downlink data packet arrives at the MAC layer may be acquired during the transmission of the downlink data packet.

Different arrival times may be acquired depending on different bearer types and different protocol entities of the base station. For example, when the base station includes an SDAP entity, the time when the downlink data packet arrives at the SDAP layer may be acquired; or when the base station does not include the SDAP entity, the arrival time when the downlink data packet arrives at the PDCP layer may be acquired; or when the split bearer is provided but the base station does not include PDCP entity, the time when the downlink data packet arrives at the RLC layer may be acquired; or when the downlink data packet is a Media Access Control Service Data Unit (MAC SDU) or a Media Access Control Packet Data unit (MAC PDU), the time when the downlink data packet arrives at the MAC layer may be acquired.

Due to different bearer types and different protocol entities of the base station, in Step 601, it is able to acquire different arrival times based on the bearer types, thereby to calculate the delay in a more flexible manner and meet the requirement of the 5G communication system in a better manner.

Step 602: acquiring the reception time of each data packet, the reception time being the time when the data packet has been received successfully.

The time when the data packet has been received successfully may include a time when an RLC feedback of the data packet has been received successfully or a time when a PDCP feedback of the data packet has been received successfully.

The time when the RLC feedback of the data packet has been received successfully may be a reception time when the base station has received a feedback indicating that the data packet has been successfully received from the UE at the RLC layer, and the time when the PDCP feedback of the data packet has been received successfully may be a reception time when the base station has received a feedback indicating that the data packet has been successfully received from the UE at the PDCP layer. Of course, in the embodiments of the present disclosure, the reception time may also be a time when a Hybrid Automatic Repeat reQuest (HRA) feedback has been received successfully, which will not be particularly defined herein.

Step 603: calculating the average delay of the downlink data packets within a certain time period based on the arrival time and the reception time, the average delay of the downlink data packets including, within a certain time period, one or more of the average delay of the downlink data packets by the same UE, in a same bearer type, in a same transmission path, on a same RB and in a same Qos flow.

During the calculation of the average delay of the downlink data packets, the delivery delay of each downlink data packet for which the feedback has been received successfully may be calculated in Steps 601 and 602, and then the average delivery delay of all the downlink data packets for which the feedbacks have been received successfully may be calculated, e.g., through the following equation:

$$M(T, qci) = \left[\frac{\sum_{\forall i} tAck(i) - tArriv(i)}{I(T)}\right],$$

where meanings of the items in the equation are shown in Table 1.

TABLE 1

| | |
|---|---|
| M (T, qci) | average delay of the data packets |
| tArriv(i) | arrival time of data packet i |
| tAck(i) | reception time of data packet i |
| i | data packet i |
| I(T) | the total quantity of the data packets within a time period for a measurement item |
| T | the time period for the measurement item |

During the calculation of the average delivery delay of the downlink data packets, the data packet for which no indication information indicating that the data packet has been received successfully (i.e., no feedback has been received successfully) shall not be taken into consideration. For example, in the above equation, the data packet i is a downlink data packet for which the feedback has been received successfully. In addition, all the data packets mentioned hereinabove may merely include the downlink data packets for which the feedbacks have been received successfully.

In addition, in a situation where a duplicate data packet has been transmitted (e.g., the data packet i has been retransmitted twice), the data packet i with the shortest delivery delay may be taken into consideration. In this way, it is able to prevent the delivery delay of the same data packet from being calculated several times, thereby to improve the calculation accuracy. In addition, when the shortest delivery delay is used, it is able to calculate the average delivery delay in a more effective manner.

In a possible embodiment of the present disclosure, the downlink data packets may include one or more of a Service Data Adaptation Protocol Service Data Unit (SDAP SDU), a Service Data Adaptation Protocol Packet Data Unit (SDAP PDU), a Packet Data Convergence Protocol Service Data Unit (PDCP SDU), a Packet Data Convergence Protocol Packet Data Unit (PDCP PDU), a Radio Link Control Service Data Unit (RLC SDU), a Radio Link Control Packet Data Unit (RLC PDU), an MAC SDU and an MAC PDU.

When the base station includes the SDAP entity, the downlink data packets may include the SDAP SDU and/or the SDAP PDU. When the base station does not include any SDAP entity, the downlink data packets may include the PDCP SDU and/or the PDCP PDU. When the split bearer is adopted and the base station does not include any PDCP entity, the downlink data packets may include the RLC SDU and/or the RLC PDU. In some other scenarios, the downlink data packets may include the MAC SDU and/or the MAC PDU.

In the embodiments of the present disclosure, it is able to calculate the delays of different downlink data packets based on bear type for the base station, so as to meet the requirement of the 5G communication system, thereby to improve the performance of the 5G communication system.

Step 604: performing radio resource configuration based on the calculated average delay.

When the delivery delay of the downlink data packet for one UE is greater than the predetermined delay threshold, the base station may quickly schedule the downlink data transmission for the UE, so as to reduce the delivery delay of the data packets for the UE. For another example, when the delivery delay of the downlink data packet for one UE is smaller than the predetermined delay threshold and the downlink data packets are being transmitted to the UE, the base station may preferentially schedule the downlink data transmission for the other UEs, so as to reduce the downlink delivery delay for the other UEs while appropriately increasing the downlink delivery delay for the UE, thereby to reduce the delivery delay of the data packets in the entire network.

It should be appreciated that, the above examples are merely for illustrative purposes, and in the embodiments of the present disclosure, the radio resource configuration will not be particularly defined. Through the above steps, it is able to improve the performance of the communication system, and further reduce the delivery delay of the data packets in the network.

Figure 7:
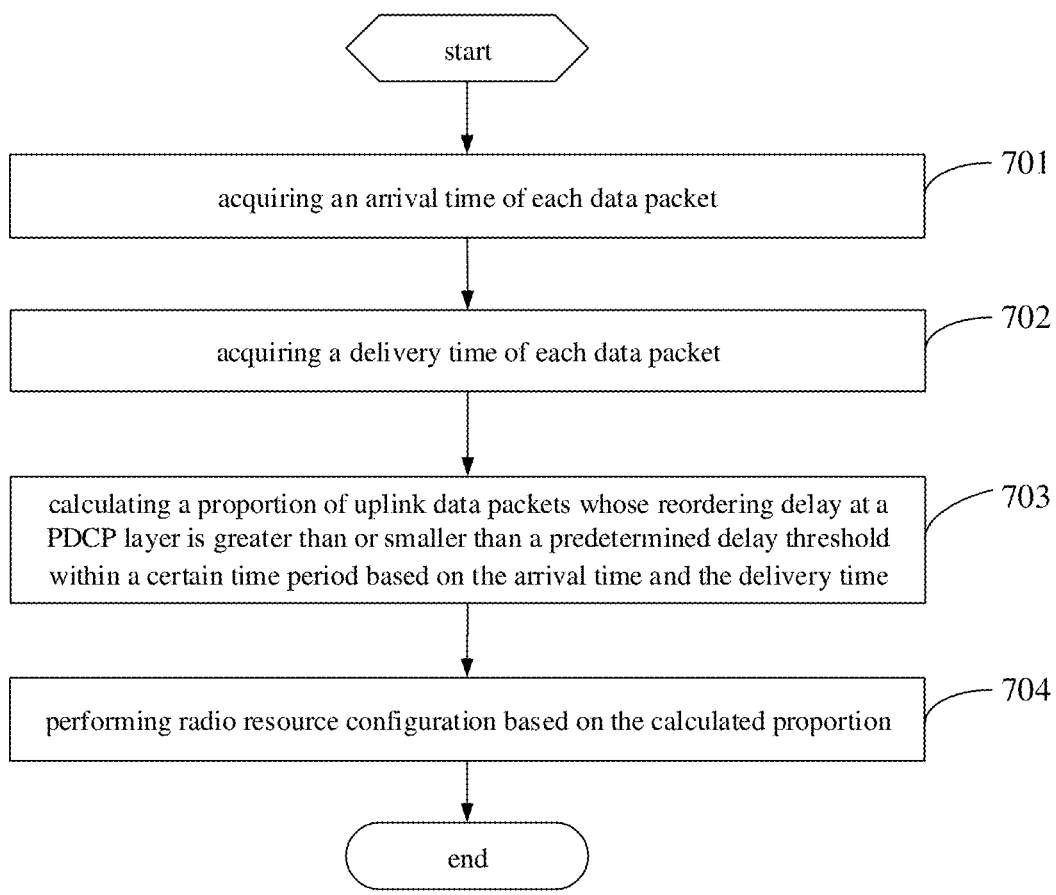
FIG. 7 is yet another flow chart of the radio resource configuration method according to one embodiment of the present disclosure.

As shown in FIG. 7, the radio resource configuration method may include the following steps.

Step 701: acquiring the arrival time of each data packet, the arrival time including the time when the data packet arrives at the PDCP layer, or the time when the data packet arrives at the PDCP layer and is placed into the reordering window.

In the embodiments of the present disclosure, the data packet may be an uplink data packet. The reordering window may be a reordering window arranged at the PDCP layer and configured to reorder the disordered data packets. In Step 701, the time when the data packet arrives at the PDCP layer or the time when the data packet arrives at the PDCP layer and is placed into the reordering window may be acquired, so as to calculate a time when the uplink data packets are reordered at the PDCP layer.

Step 702: acquiring the delivery time of each data packet, the delivery time being a time when the data packet is transmitted from the PDCP layer to the high-layer protocol entity.

Step 703: calculating the proportion of the uplink data packets whose reordering delay at the PDCP layer is greater than or smaller than the predetermined delay threshold within a certain time period based on the arrival time and the delivery time.

In Step 703, the proportion of the uplink data packets whose reordering delay at the PDCP layer is greater than or smaller than the predetermined delay threshold within a certain time period may be selectively calculated according to the requirements of the network, the services or the UE, so as to perform the radio resource configuration flexibly. In addition, it should be appreciated that, when calculating the proportion of the uplink data packets whose reordering delay at the PDCP layer is greater than or smaller than the predetermined delay threshold, different predetermined delay thresholds may be adopted. In other words, two predetermined delay thresholds may be provided, a larger one may be used for the calculation of the proportion of the uplink data packets whose reordering delay at the PDCP layer is greater than the predetermined delay threshold, and a smaller one may be used for the calculation of the proportion of the uplink data packets whose reordering delay at the PDCP layer is smaller than the predetermined delay threshold. In this way, it is able to calculate the delay in a more accurate manner. Of course, in some scenarios, a same predetermined delay threshold may be adopted, which will not be particularly defined herein.

In the embodiments of the present disclosure, during the calculation of the proportion, the reordering delay of each uplink data packet at the PDCP layer may be calculated in Steps 701 and 702, and this reordering delay may be equal to a value acquired by subtracting the arrival time from the delivery time of the uplink data packet. For example, the proportion may be calculated through the following equations:

$$M(T, qci) = \frac{nExcess(T, qci)}{nTotal(T, qci)},$$
$$tULdelay(i, qci) = tDeliv(i, qci) - tArrival(i, qci)$$

where meanings of the items in the equations are shown in Table 2.

TABLE 2

| | |
|---|---|
| M (T, qci) | the proportion of the data packets whose reordering delay at the PDCP layer is greater than or smaller than the predetermined delay threshold |
| nExcess(T, qci) | the quantity of the data packets whose reordering delay within a time period T is greater than or smaller than a predetermined delay threshold tULdelay(i, qci) |
| nTotal(T, qci) | the quantity of the data packets transmitted within the time period T |
| tULdelay(i, qci) | the delay of the data packet i from the arrival time to the delivery time |
| tDeliv(i, qci) | the delivery time of the data packet i |
| tArrival(i, qci) | the arrival time of the data packet i |
| i | the data packet i within the time period T |
| T | the time period for the measurement |

In a possible embodiment of the present disclosure, the uplink data packets for the calculation of the proportion may include all the uplink data packets received within the time period, the uplink data packets from the same UE, the uplink data packets with the same QCI, the uplink data packets on the same bearer, the uplink data packets in the same QoS flow, the uplink data packets transmitted on the same RB and through the same path, the uplink data packets in the same cell group, or the uplink data packets of the same bearer type.

Based on the above uplink data packets, it may be calculated that the proportion of the above uplink data packets to: all the uplink data packets received within the time period; or the uplink data packets received from the same UE within the time period; or uplink data packets with the same QCI received within the time period; or the uplink data packets received on the same bearer within the time period; or the uplink data packets for the same QoS flow received within the time period; or the uplink data packets received on the same RB and through the same path within the same time period; or the uplink data packets for the same cell group received within the time period; or the uplink data packets of the same bearer type received within the time period.

Step 703 may include: calculating the proportion of the uplink data packets whose reordering delay at the PDCP layer is greater than or smaller than the predetermined delay threshold to all the uplink data packets received by the base station within the time period; or calculating the proportion of the uplink data packets whose reordering delay at the PDCP layer is greater than or smaller than the predetermined delay threshold to the uplink data packets received by the base station from the same UE within the time period; or calculating the proportion of the uplink data packets whose reordering delay at the PDCP layer is greater than or smaller than the predetermined delay threshold to the uplink data packets with the same QCI received by the base station within the time period; or calculating the proportion of the uplink data packets whose reordering delay at the PDCP layer is greater than or smaller than the predetermined delay threshold to the uplink data packets received by the base station on the same bearer within the time period; or calculating the proportion of the uplink data packets whose reordering delay at the PDCP layer is greater than or smaller than the predetermined delay threshold to the uplink data packets in the same QoS flow received by the base station within the time period; or calculating the proportion of the uplink data packets whose reordering delay at the PDCP layer is greater than or smaller than the predetermined delay threshold to the uplink data packets received by the base station on the same RB and through the same path within the time period; or calculating the proportion of the uplink data packets whose reordering delay at the PDCP layer is greater than or smaller than the predetermined delay threshold to the uplink data packets in the same cell group received by the base station within the time period; or calculating the proportion of the uplink data packets whose reordering delay at the PDCP layer is greater than or smaller than the predetermined delay threshold to the uplink data packets of the same bearer type received by the base station within the time period.

The calculating the proportion of the uplink data packets whose reordering delay at the PDCP layer is greater than or smaller than the predetermined delay threshold to the uplink data packets received by the base station on the same RB and in the same path within the time period may include: calculating the proportion of the uplink data packets whose reordering delay at the PDCP layer is greater than or smaller than the predetermined delay threshold to the uplink data packets received by the base station on a certain split bearer and through a certain path within the base station; or calculating the proportion of the uplink data packets whose reordering delay at the PDCP layer is greater than or smaller than the predetermined delay threshold to the uplink data packets received by the base station on a certain duplicate bearer and in a certain path within the time period.

In this regard, it is able to calculate the proportion in a more accurate manner, thereby to meet the requirements on the new functions introduced into the 5G communication system, and improve the performance of the communication system.

In a possible embodiment of the present disclosure, the uplink data packet may include one or more of a PDCP SDU, a PDCP PDU and an RLC SDU.

In the embodiments of the present disclosure, it is able to calculate the proportion of different uplink data packets whose reordering delay at the PDCP layer is greater than or smaller than the predetermined delay threshold, thereby to improve the system flexibility.

In another possible embodiment of the present disclosure, the uplink data packets for the calculation of the proportion may include: one uplink data packet among the uplink data packets which have been received repeatedly within the time period; or the uplink data packets received within the time period and located in the reordering window, and the uplink data packets located within the reordering window but ignored due to the expiration of the reordering timer at the PDCP layer. A reordering delay of the ignored uplink data packet may be a time value of the reordering timer, and the reordering window may be a data packet sequence window.

In the embodiments of the present disclosure, for the uplink data packet which has been received repeatedly, merely one reordering delay of the uplink data packet at the PDCP layer may be calculated. To be specific, a first-time reordering delay of the uplink data packet at the PDCP layer may be calculated, i.e., the uplink data packet received at the other times may not be taken as the data packet for the calculation of the proportion, so as to ensure the correct proportion.

In addition, during the calculation of the proportion, merely the delay of the data packets received within the time period and in the reordering window may be calculated, and the discarded data packet i outside the reordering window may not be taken into consideration. In other words, the calculated proportion is merely the proportion of the data packets in the reordering window, so as to accurately reflect the performance of the PDCP layer.

In addition, during the calculation of the proportion, the delay of the data packet ignored due to the expiration of the reordering timer may be the time value of the reordering timer, so as to prevent the occurrence of such a situation where it is impossible to calculate the proportion when some data packets are ignored due to the expiration of the reordering timer. Furthermore, the value (the time value) of the reordering timer may be taken as the delay of the ignored data packet, so as to ensure an effect of the reordering timer. This is because, when the data packet is ignored by the reordering timer, it means that the delay of the data packet exceeds the time value of the reordering timer.

For example, data packets 1 to 10 may be located in the reordering window. When the data packet 10 has currently been received but the data packet 8 has not been received, the reordering timer may be started during the reception of the data packet 10. When the data packet 8 has not been received yet before the expiration of the reordering timer, the value of the reordering timer may be taken as the reordering delay of the data packet 8. When the data packet 8 has been received before the expiration of the reordering timer, it may belong to the data packets received within the time period and located in the reordering window.

Step 704: performing radio resource configuration based on the calculated proportion.

For example, when the reordering delay of the uplink data packets from one UE at the PDCP layer is greater than the predetermined delay threshold, the base station may set a smaller value for the reordering timer, so as to reduce the reordering delay of the uplink data packets from the UE at the PDCP layer. For another example, when the reordering delay of the uplink data packets from one UE at the PDCP layer is smaller than the predetermined delay threshold, the base station may set a larger value for the reordering timer, so as to reduce the quantity of the uplink data packets discarded due to the expiration of the reordering timer while appropriately increasing the delivery delay of the uplink data from the UE.

It should be appreciated that, the above examples are merely for illustrative purposes, and in the embodiments of the present disclosure, the radio resource configuration will not be particularly defined. Through the above steps, it is able to improve the performance of the communication system, and further reduce the delivery delay of the data packets in the network.

Figure 8:
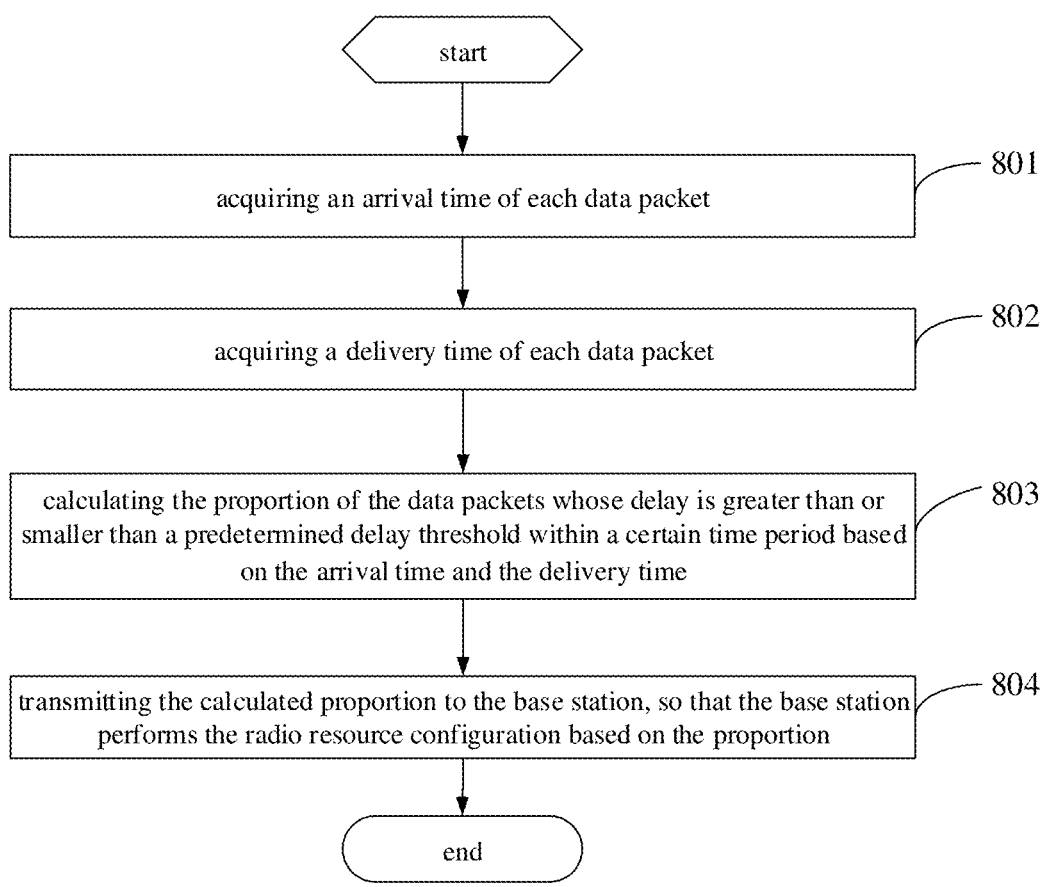
FIG. 8 is yet another flow chart of the radio resource configuration method according to one embodiment of the present disclosure.

The present disclosure further provides in some embodiments a radio resource configuration method applied for a UE which, as shown in FIG. 8, includes the following steps.

Step 801: acquiring an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer.

During the calculation of a proportion of uplink data packets each with a delivery delay, the arrival time may include the time when the data packet arrives at the SDAP layer, the time when the data packet arrives at the PDCP layer, the time when the data packet arrives at the RLC layer, or the time when the data packet arrives at the MAC layer. During the calculation of a proportion of the downlink data packets whose reordering delay at the PDCP layer is greater than or smaller than a predetermined delay threshold, the arrival time may include the time when the data packet arrives at the PDCP layer or the time when the data packet arrives at the PDCP layer and is placed into the reordering window.

The arrival time of each uplink data packet acquired by the UE may refer to the arrival time of each downlink data packet acquired by the base station as shown in FIGS. 5-6, and the arrival time of each downlink data packet acquired by the UE may refer to the arrival time of each uplink data packet acquired by the base station as shown in FIGS. 5 and 7, which will not be particularly defined herein.

Step 802: acquiring a delivery time of each data packet, the delivery time being a time when the data packet is transmitted from the PDCP layer to a high-layer protocol entity, a time when the data packet is transmitted to a physical layer PHY, a time when the data packet is transmitted through an air interface, or a time when a feedback of the data packet has been received successfully.

During the calculation of the proportion of the uplink data packets each with the delivery delay, the delivery time may include the time when the data packet is transmitted to the physical layer PHY, the time when the data packet is transmitted via the air interface, or the time when the feedback of the data packet has been received successfully. During the calculation of the proportion of the downlink data packets each with the reordering delay at the PDCP layer, the delivery time may include the time when the data packet is transmitted from the PDCP layer to the high-layer protocol entity.

The time when the feedback of the data packet has been received successfully may include a time when an HARQ feedback has been received successfully, a time when an RLC feedback of the data packet has been received successfully or a time when a PDCP feedback of the data packet has been received successfully.

Step 803: calculating the proportion of the data packets whose delay is greater than or smaller than a predetermined delay threshold within a certain time period based on the arrival time and the delivery time, the delay of the data packets including the reordering delay of the downlink data packets at the PDCP layer or the delivery delay of the uplink data packets, the proportion including one or more of a proportion in data packets for the UE, a proportion in data packets on a same RB, a proportion in data packets in a same QoS flow, a proportion in data packets received on a same split bearer and in a same path, a proportion in data packets received on a same duplicate bearer and in a same path, a proportion in data packets in a same cell group, and a proportion in data packets of a same bearer type.

Step 803 may be understood as calculating the proportion of the downlink data packets whose reordering delay at the PDCP layer is greater than or smaller than the predetermined delay threshold or calculating the proportion of the uplink data packets whose delivery delay is greater than or smaller than the predetermined delay threshold based on the arrival time and the delivery time. Different predetermined delay thresholds may be adopted, so as to improve the calculation accuracy. Of course, in some scenarios, a same predetermined delay threshold may also be adopted.

The meaning of the calculation of the proportion in the data packets received by the UE, the proportion in the data packets on the same RB, the proportion in the data packets in the same QoS flow, the proportion in the data packets received on the same split bearer and in the same path, the proportion in the data packets received on a same duplicate bearer and in a same path, the proportion in the data packets in the same cell group or the proportion in the data packets of a same bearer type may be that, the proportion of the data packets whose delay is greater than or smaller than the predetermined delay threshold to the data packets for the UE may be calculated; the proportion of the data packets whose delay is greater than or smaller than the predetermined delay threshold to the data packets on a certain RB may be calculated; the proportion of the data packets whose delay is greater than or smaller than the predetermined delay threshold to the data packets for a certain QoS flow may be calculated; the proportion of the data packets whose delay is greater than or smaller than the predetermined delay threshold to the data packets on a certain split bearer and through a certain path may be calculated; the proportion of the data packets whose delay is greater than or smaller than the predetermined delay threshold to the data packets on a certain duplicate bearer and through a certain path may be calculated; the proportion of the data packets whose delay is greater than or smaller than the predetermined delay threshold to the data packets for a certain cell group may be calculated; the proportion of the data packets whose delay is greater than or smaller than the predetermined delay threshold to the data packets of a certain bearer type may be calculated.

Step 804: transmitting the calculated proportion to the base station, so that the base station performs the radio resource configuration based on the proportion.

After the calculation of the proportion, the UE may report the calculated proportion to the base station, so that the base station performs the radio resource configuration based on the proportion.

When the delivery delay of the uplink data packet for one UE is greater than the predetermined delay threshold, the base station may quickly schedule the uplink data transmission for the UE, so as to reduce the delivery delay of the data packets for the UE. For another example, when the delivery delay of the uplink data packet for one UE is smaller than the predetermined delay threshold and the uplink data packets are being transmitted, the base station may preferentially schedule the uplink data transmission for the other UEs, so as to reduce the uplink delivery delay for the other UEs while appropriately increasing the delivery delay of the uplink data for the UE, thereby to reduce the delivery delay of the data packets in the entire network.

When the reordering delay of the downlink data packets for one UE at the PDCP layer is greater than the predetermined delay threshold, the base station may set a smaller value for a reordering timer, so as to reduce the reordering delay of the downlink data packets for the UE at the PDCP layer. For another example, when the reordering delay of the downlink data packets for one UE at the PDCP layer is smaller than the predetermined delay threshold, the base station may set a larger value for the reordering timer, so as to reduce the quantity of the downlink data packets discarded due to the expiration of the reordering timer while appropriately increasing the delivery delay of the uplink data from the UE.

It should be appreciated that, the above examples are merely for illustrative purposes, and in the embodiments of the present disclosure, the radio resource configuration will not be particularly defined. Through the above steps, it is able to reduce the delivery delay at the UE.

According to the embodiments of the present disclosure, through the above steps, it is able to acquire, through calculation, the delay adapted to the functions introduced into the 5G communication system, and perform the radio resource configuration based on the calculated delay, thereby to improve the performance of the communication system and further reduce the delivery delay of the data packets in the network.

Figure 9:
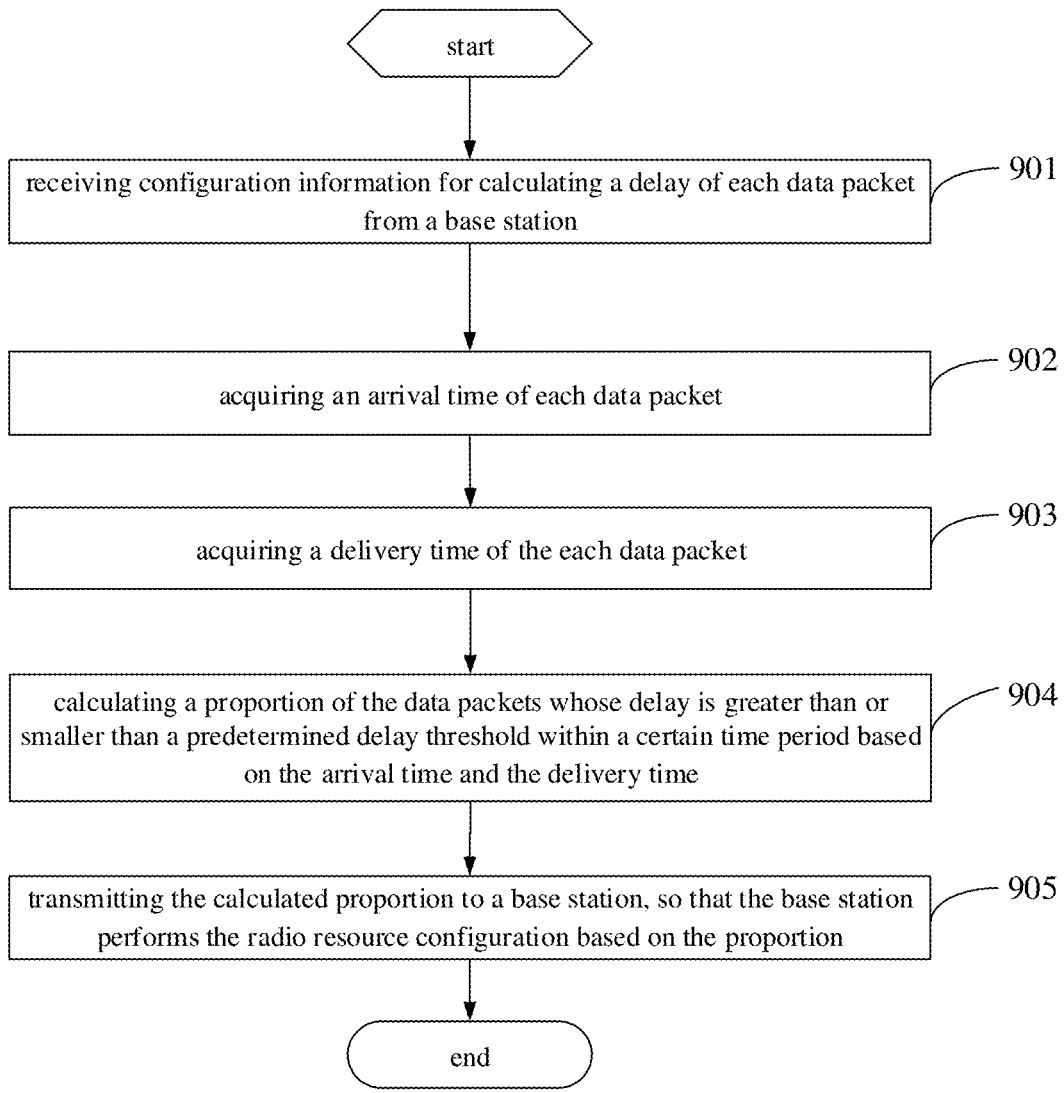
FIG. 9 is yet another flow chart of the radio resource configuration method according to one embodiment of the present disclosure.

As shown in FIG. 9, the radio resource configuration method for the UE may include the following steps.

Step 901: receiving configuration information for calculating the delay of each data packet from the base station. The configuration information may include one or more of a measurement item identifier, a to-be-measured object identifier, and a report trigger configuration.

The measurement item identifier may include a measurement item identifier for the delivery delay of each uplink data packet or a measurement item identifier for the reordering delay of each downlink data packet at the PDCP layer.

The measurement item identifier for the delivery delay of each uplink data packet may be used to indicate the UE to calculate the delivery delay of the uplink data packet, and the measurement item identifier for the reordering delay of each downlink data packet at the PDCP layer may be used to indicate the UE to calculate the reordering delay of the downlink data packet at the PDCP layer.

The to-be-measured object identifier may be used to indicate the UE to measure a specific object, and it may include one or more a QoS flow identifier, a split bearer path identifier, a duplicate bearer path identifier, a bearer type identifier and a cell group identifier.

The cell group identifier may be MCG or SCG, and the bearer type identifier may include at least one of an MCG bearer, an SCG bearer, a split bearer and a duplicate bearer.

Through the to-be-measured object identifier, it is able to indicate the UE to calculate the delay of the specific object, thereby to improve the system flexibility. In addition, it is able to prevent the UE from measuring all the objects, thereby to reduce the power consumption of the UE.

The report trigger configuration may be a trigger condition for triggering the UE to report a calculation result. For example, the report trigger configuration may include a predetermined delay threshold, a predetermined proportion threshold, a predetermined reporting condition, and a period of a periodical reporting operation.

The predetermined reporting condition may include one or more of a first predetermined condition, a second predetermined condition, a third predetermined condition and a fourth predetermined condition.

To be specific, upon the receipt of the report trigger configuration, the UE may parse the above contents so as to acquire one or more of: a configuration indicating that the proportion of the data packets whose reordering delay at the PDCP layer within a certain time period is greater than the predetermined delay threshold meets the first predetermined condition; a configuration indicating that the proportion of the data packets whose reordering delay at the PDCP layer within a certain time period is smaller than the predetermined delay threshold meets the second predetermined condition; a configuration indicating that the proportion of the data packets whose delivery delay within a certain time period is smaller than the predetermined delay threshold meets the third predetermined condition; a configuration indicating that the proportion of the data packets whose delivery delay within a certain time period is greater than the predetermined delay threshold meets the fourth predetermined condition; and a configuration indicating the periodical reporting operation.

The first predetermined condition may be a condition where the proportion of the data packets whose reordering delay at the PDCP layer within a certain time period is greater than the predetermined delay threshold is greater than or smaller than the predetermined proportion threshold.

The second predetermined condition may be a condition where the proportion of the data packets whose reordering delay at the PDCP layer within a certain time period is smaller than the predetermined delay threshold is greater than or smaller than the predetermined proportion threshold.

The third predetermined condition may be a condition where the proportion of the uplink data packets whose delivery delay within a certain time period is greater than the predetermined delay threshold is smaller than the predetermined proportion threshold.

The fourth predetermined condition may be a condition where the proportion of the uplink data packets whose delivery delay within a certain time period is smaller than the predetermined delay threshold is greater than or smaller than the predetermined proportion threshold.

In addition, for the periodical reporting operation, the UE may directly report the calculation result periodically, i.e., at a predetermined interval, or may periodically report the calculation result when the proportion of the data packets whose reordering delay at the PDCP layer within a certain time period is greater than the predetermined delay threshold is greater than the predetermined proportion threshold, or may periodically report the calculation result when the proportion of the data packets whose reordering delay at the PDCP layer within a certain time period is greater than the predetermined delay threshold is smaller than the predetermined proportion threshold, or may periodically report the calculation result when the proportion of the data packets whose reordering delay at the PDCP layer within a certain time period is smaller than the predetermined delay threshold is greater than the predetermined proportion threshold, or may periodically report the calculation result when the proportion of the data packets whose reordering delay at the PDCP layer within a certain time period is smaller than the predetermined delay threshold is smaller than the predetermined proportion threshold, or may periodically report the calculation result when the proportion of the uplink data packets whose delivery delay within a certain time period is greater than the predetermined delay threshold is greater than the predetermined proportion threshold; or may periodically report the calculation result when the proportion of the uplink data packets whose delivery delay within a certain time period is greater than the predetermined delay threshold is smaller than the predetermined proportion threshold; or may periodically report the calculation result when the proportion of the uplink data packets whose delivery delay within a certain time period is smaller than the predetermined delay threshold is greater than the predetermined proportion threshold; or may periodically report the calculation result when the proportion of the uplink data packets whose delivery delay within a certain time period is smaller than the predetermined delay threshold is smaller than the predetermined proportion threshold.

Through the report trigger configuration, it is able to indicate the UE to report the calculation result flexibly, thereby to save the functions and the transmission resources of the UE.

In a possible embodiment of the present disclosure, the configuration information may further include one or more of time window information about the time period, a predetermined delay threshold in the report trigger configuration, predetermined conditions in the report trigger configuration, and a period of the periodical reporting operation.

The predetermined delay threshold in the report trigger configuration may include the delay threshold corresponding to the reordering delay of the data packets at the PDCP layer and/or the delay threshold corresponding to the delivery delay. The predetermined conditions in the report trigger configuration may include one or more of the first predetermined condition, the second predetermined condition, the third predetermined condition and the fourth predetermined condition.

Of course, the above information may be defined in a protocol or pre-configured by the UE. For example, the time window information about the time period may be 10 ms, the predetermined delay threshold may be 10 ms, the predetermined proportion threshold may be 10%, and the period of the periodical reporting operation may be 50 ms.

In this regard, it is able to flexibly configure relevant parameters for the UE, so as to improve a radio resource configuration effect.

It should be appreciated that, in the embodiments of the present disclosure, Step 901 may be optional. For example, the configuration information may be pre-configured by the UE or defined in a protocol. In addition, in FIGS. 5 to 7, the radio resource configuration method may further include a step of transmitting, by the base station, the configuration information to the UE with a same beneficial effect, which will not be particularly defined herein.

Step 902: acquiring the arrival time of each data packet, the arrival time including the time when the data packet arrives at the SDAP layer, the time when the data packet arrives at the PDCP layer, the time when the data packet arrives at the PDCP layer and is placed into the reordering window, the time when the data packet arrives at the RLC layer or the time when the data packet arrives at the MAC layer.

Step 903: acquiring the delivery time of the each data packet, the delivery time being the time when the data packet is transmitted from the PDCP layer to the high-layer protocol entity, the time when the data packet is transmitted to the physical layer PHY, the time when the data packet is transmitted through the air interface, or the time when the feedback of the data packet has been received. The feedback may be used to represent that the base station has received the data packet successfully.

Step 904: calculating the proportion of the data packets whose delay is greater than or smaller than the predetermined delay threshold within a certain time period based on the arrival time and the delivery time, the delay of the data packet including the reordering delay of the downlink data packet at the PDCP layer or the delivery delay of the uplink data packet, the proportion including one or more of the proportion in the data packets for the UE, the proportion in the data packets on a same RB, the proportion in the data packets in a same QoS flow, the proportion in the data packets received on a same split bearer and in a same path, the proportion in the data packets received on a same duplicate bearer and in a same path, the proportion in the data packets in a same cell group, and the proportion in the data packets of a same bearer type.

In Step 904, the proportion may be calculated based on the configuration information, and in Steps 902 and 903, the arrival time and the delivery time of the data packet may be acquired based on the configuration information.

During the calculation of the proportion of the uplink data packets whose delivery delay is greater than or smaller than the predetermined delay threshold, the delivery delay of each uplink data packet may be calculated in Steps 902 and 903, and then the proportion may be calculated through the following equations:

$$M(T, qci) = \frac{nExcess(T, qci)}{nTotal(T, qci)},$$
$$tULdelay(i, qci) = tDeliv(i, qci) - tArrival(i, qci)$$

where meanings of the items in the equations are shown in Table 3.

TABLE 3

| | |
|---|---|
| M (T, qci) | the proportion of the data packets whose reordering delay at the PDCP layer is greater than or smaller than the predetermined delay threshold |
| nExcess(T, qci) | the quantity of the data packets whose delay within a time period T is greater than or smaller than the predetermined delay threshold tULdelay(i, qci) |
| nTotal(T, qci) | the quantity of the data packets transmitted within the time period T |
| tULdelay(i, qci) | the delay of the data packet i from the arrival time to the delivery time |
| tDeliv(i, qci) | the delivery time of the data packet i |
| tArrival(i,qci) | the arrival time of the data packet i |
| i | the data packet i within the time period T |
| T | the time period for the measurement |

During the calculation of the proportion of the downlink data packets whose reordering delay at the PDCP layer is greater than or smaller than the predetermined delay threshold, the reordering delay of each downlink data packet at the PCDP layer may be calculated in Steps 902 and 903, and then the proportion may be calculated through the following equations:

$$M(T, qci) = \frac{nExcess(T, qci)}{nTotal(T, qci)},$$
$$tULdelay(i, qci) = tDeliv(i, qci) - tArrival(i, qci)$$

where meanings of the items in the equations are shown in Table 4.

TABLE 4

| | |
|---|---|
| M(T, qci) | the proportion of the data packets whose reordering delay at the PDCP layer is greater than or smaller than the predetermined delay threshold |

TABLE 4-continued

| | |
|---|---|
| nExcess(T, qci) | the quantity of the data packets whose delay within a time period T is greater than or smaller than a predetermined delay threshold tULdelay(i, qci) |
| nTotal(T, qci) | the quantity of the data packets transmitted within the time period T |
| tULdelay(i, qci) | the delay of the data packet i from the arrival time to the delivery time |
| tDeliv(i, qci) | the delivery time of the data packet i |
| tArrival(i, qci) | the arrival time of the data packet i |
| i | the data packet i within the time period T |
| T | the time period for the measurement |

It should be appreciated that, in the embodiments of the present disclosure, the calculation of the proportion may not be limited to the above equations, which will not be particularly defined herein.

In a possible embodiment of the present disclosure, when the delay of each data packet includes the delivery delay of the uplink data packet, the data packet may include one of more of an SDAP SDU, SDAP PDU, a PDCP SDU, a PDCP PDU, an RLC SDU, an RLC PDU, an MAC SDU and an MAC PDU.

When the delay of each data packet includes the reordering delay of the downlink data packet at the PDCP layer, the data packet may include one or more of a PDCP SDU, a PDCP PDU and an RLC SDU.

The delivery delay of different data packets may be calculated based on the protocol entity of the UE or the to-be-measured object.

In the embodiments of the present disclosure, it is able to calculate the delay of different data packets, thereby to improve the delay calculation flexibility.

In another possible embodiment of the present disclosure, the downlink data packets for the calculation of the proportion may include: one downlink data packet among the downlink data packets which have been received repeatedly within the time period; or the downlink data packets received within the time period and located in the reordering window, and the downlink data packets located within the reordering window but ignored due to the expiration of the reordering timer at the PDCP layer. A reordering delay of the ignored downlink data packet may be a time value of the reordering timer, and the reordering window may be a data packet sequence window.

The calculation of the proportion may refer to that in the embodiments as shown in FIGS. 6 and 7 with a same beneficial effect, which will not be particularly defined herein.

In a possible embodiment of the present disclosure, in the embodiments of the present disclosure, the uplink data packets for the calculation of the proportion may include an uplink data packet with a shortest delivery delay when the uplink data packet has been received repeatedly within the time period.

In this regard, during the calculation of the proportion of the uplink data packets with the delivery delay, for the uplink data packet that has been received repeatedly, the shortest delivery delay may be taken as the delivery delay of the uplink data packet, so as to ensure the accuracy of the calculated proportion.

Step 905: transmitting the calculated proportion to the base station, so that the base station performs the radio resource configuration based on the proportion.

In a possible embodiment of the present disclosure, the transmitting the calculated proportion to the base station may include transmitting the calculated proportion to the base station when the report trigger condition has been met based on the configuration information.

In the embodiments of the present disclosure, the calculated proportion may be transmitted to the base station only when the report trigger condition has been met, so as to reduce the functions and the transmission resources. The reporting the calculated proportion when the report trigger condition has been met may include one or more of: reporting the calculated proportion when the proportion of the data packets whose reordering delay at the PDCP layer within a certain time period is greater than the predetermined delay threshold is greater than the predetermined proportion threshold; reporting the calculated proportion when the proportion of the data packets whose reordering delay at the PDCP layer within a certain time period is greater than the predetermined delay threshold is smaller than the predetermined proportion threshold; reporting the calculated proportion when the proportion of the data packets whose delivery delay within a certain time period is smaller than the predetermined delay threshold is greater than the predetermined proportion threshold; reporting the calculated proportion when the proportion of the data packets whose delivery delay within a certain time period is smaller than the predetermined delay threshold is smaller than the predetermined proportion threshold; and a configuration indicating the periodical reporting operation; periodically reporting the calculated proportion when the proportion of the data packets whose reordering delay at the PDCP layer within a certain time period is greater than the predetermined delay threshold is greater than the predetermined proportion thresholds; periodically reporting the calculated proportion when the proportion of the data packets whose reordering delay at the PDCP layer within a certain time period is greater than the predetermined delay threshold is smaller than the predetermined proportion thresholds; periodically reporting the calculated proportion when the proportion of the data packets whose reordering delay at the PDCP layer within a certain time period is smaller than the predetermined delay threshold is greater than the predetermined proportion thresholds; periodically reporting the calculated proportion when the proportion of the data packets whose reordering delay at the PDCP layer within a certain time period is smaller than the predetermined delay threshold is smaller than the predetermined proportion thresholds; reporting the calculated proportion when the proportion of uplink data packets whose delivery delay is greater than the predetermined delay threshold is smaller than the predetermined proportion threshold; reporting the calculated proportion when the proportion of uplink data packets whose delivery delay is smaller than the predetermined delay threshold is greater than the predetermined proportion threshold; reporting the calculated proportion when the proportion of uplink data packets whose delivery delay is smaller than the predetermined delay threshold is smaller than the predetermined proportion threshold; periodically reporting the calculated proportion when the proportion of uplink data packets whose delivery delay is greater than the predetermined delay threshold is greater than the predetermined proportion thresholds; periodically reporting the calculated proportion when the proportion of uplink data packets whose delivery delay is greater than the predetermined delay threshold is smaller than the predetermined proportion threshold; periodically reporting the calculated proportion when the proportion of uplink data packets whose delivery delay is smaller than the predetermined delay threshold is greater than the predetermined proportion threshold; periodically reporting the calculated proportion when the proportion of uplink data packets whose delivery delay is smaller than the predetermined delay threshold is smaller than the predetermined proportion threshold; and periodically reporting the calculated proportion.

Further, the transmitting the calculated proportion to the base station may include transmitting the calculated proportion and the corresponding to-be-measured object identifier to the base station.

In the embodiments of the present disclosure, the corresponding to-be-measured object identifier may also be transmitted to the base station while transmitting the calculated proportion. In this way, the base station may accurately and directly determine the proportion of the specific to-be-measured object calculated by the UE. The to-be-measured object identifier may include one or more of an RB identifier, a QoS flow identifier, a split bearer path identifier (e.g., a logic channel identifier or a cell group identifier for a path corresponding to the bearer), a duplicate bearer path identifier (e.g., a logic channel identifier for a path corresponding to the bearer), a cell group identifier (e.g., MCG or SCG), and a bearer type identifier (e.g., an MCG bearer, an SCG bearer, a split bearer, or a duplicate bearer).

In this regard, the UE may calculate the proportion corresponding to the identifier, and report it to the base station, so that the base station may perform the radio resource configuration in a better manner.

Figure 10:
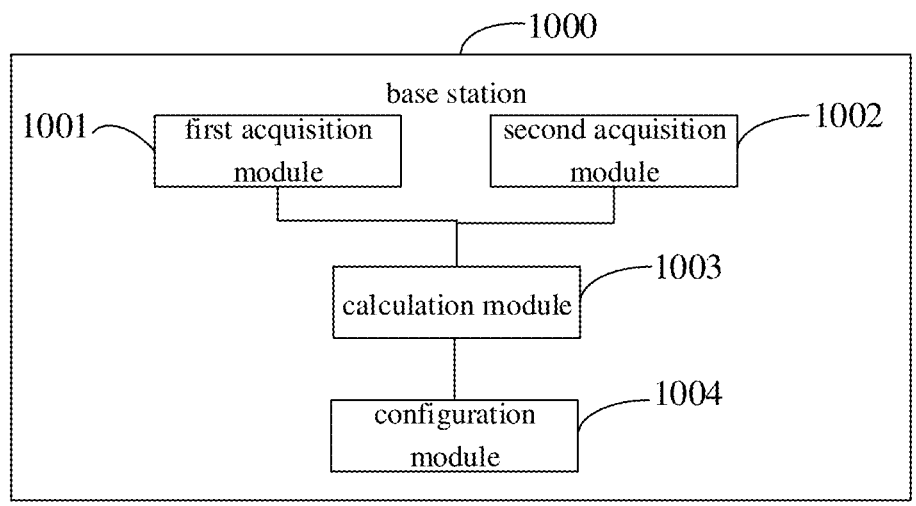
FIG. 10 is a schematic view showing a base station according to one embodiment of the present disclosure.

The present disclosure further provides in some embodiments a base station 100 which, as shown in FIG. 10, includes: a first acquisition module 1001 configured to acquire an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer; a second acquisition module 1002 configured to acquire a delivery time or a reception time of each data packet, the delivery time being a time when the data packet is transmitted from the PDCP layer to a high-layer protocol entity, and the reception time being a time when the data packet has been received successfully; a calculation module 1003 configured to calculate an average delay of downlink data packets within a certain time period or a proportion of uplink data packets whose reordering delay at the PDCP layer is greater than or smaller than a predetermined delay threshold within a certain time period based on the arrival time and the delivery time or the reception time, the average delay of the downlink data packets including one or more of the average delay of the downlink data packets received within a certain time period by a same UE, of a same bearer type, in a same transmission path, on a same RB, and in a same QoS flow; and a configuration module 1004 configured to perform radio resource configuration based on the calculated average delay or proportion.

In a possible embodiment of the present disclosure, the downlink data packet may include one or more of an SDAP SDU, a SDAP PDU, a PDCP SDU, a PDCP PDU, an RLC SDU, an RLC PDU, an MAC SDU and an MAC PDU, and the uplink data packet may include one or more of a PDCP SDU, a PDCP PDU and an RLC SDU.

In a possible embodiment of the present disclosure, the time when the data packet has been received successfully may include a time when an RLC feedback of the data packet has been received successfully or a time when a PDCP feedback of the data packet has been received successfully.

In a possible embodiment of the present disclosure, the uplink data packets for the calculation of the proportion may include all uplink data packets received within the time period, uplink data packets for a same UE, uplink data packets with a same QCI, uplink data packets on a same bearer, uplink data packets in a same QoS flow, uplink data packets on a same RB and in a same path, uplink data packets in a same cell group, or uplink data packets of a same bearer type.

In a possible embodiment of the present disclosure, the uplink data packets for the calculation of the proportion may include: one uplink data packet among the uplink data packets which have been received repeatedly within the time period; or the uplink data packets received within the time period and located in the reordering window, and the uplink data packets located within the reordering window but ignored due to the expiration of the reordering timer at the PDCP layer. A reordering delay of the ignored uplink data packet may be a time value of the reordering timer, and the reordering window may be a data packet sequence window.

The UE in the embodiments of the present disclosure is capable of implementing the procedures for the base station in FIGS. 2-5, which will not be particularly defined herein. According to the UE in the embodiments of the present disclosure, it is able to improve the performance of the communication system, and further reduce the delivery delay of the data packets in the network.

Figure 11:
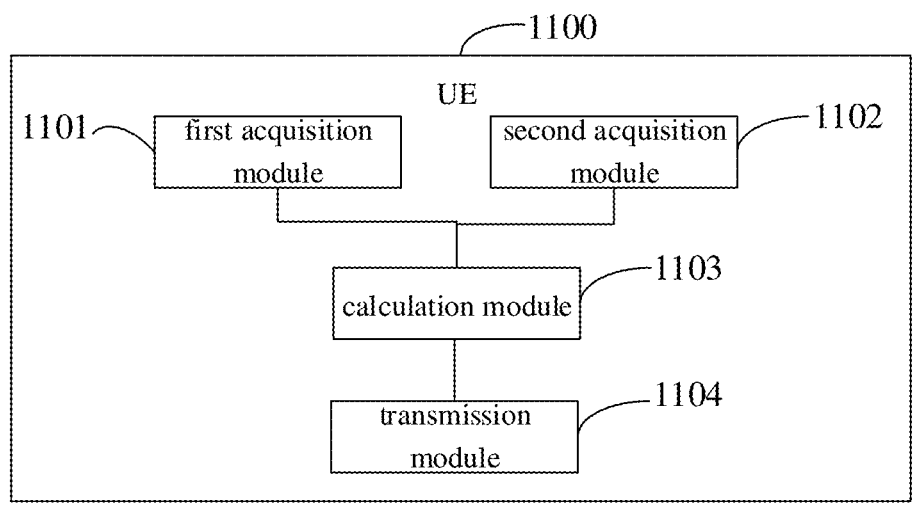
FIG. 11 is a schematic view showing a UE according to one embodiment of the present disclosure.

The present disclosure further provides in some embodiments a UE 1100 which, as shown in FIG. 11, includes: a first acquisition module 1101 configured to acquire the arrival time of each data packet, the arrival time including a time when the data packet arrives at an SDAP layer, a time when the data packet arrives at a PDCP layer, a time when the data packet arrives at a PDCP layer and is placed into a reordering window, a time the data packet arrives at an RLC layer, or a time when the data packet arrives at an MAC layer; a second acquisition module 1102 configured to acquire a delivery time of each data packet, the delivery time being a time when the data packet is transmitted from the PDCP layer to a high-layer protocol entity, a time when the data packet is transmitted to a physical layer PHY, a time when the data packet is transmitted through an air interface, or a time when a feedback of the data packet has been received successfully, the feedback being used to indicate that a base station has received the data packet successfully; a calculation module 1103 configured to calculate a proportion of data packets whose delay is greater than or smaller than a predetermined delay threshold within a certain time period based on the arrival time and the delivery time, the delay of the data packets including a reordering delay of downlink data packets at the PDCP layer or a delivery delay of uplink data packets, the proportion including one or more of a proportion in data packets for the UE, a proportion in data packets on a same RB, a proportion in data packets in a same QoS flow, a proportion in data packets received on a same split bearer and in a same path, a proportion in data packets received on a same duplicate bearer and in a same path, a proportion in data packets in a same cell group, and a proportion in data packets of a same bearer type; and a transmission module 1104 configured to transmit the calculated proportion to the base station, so that the base station performs the radio resource configuration based on the proportion.

In a possible embodiment of the present disclosure, when the delay of the data packet includes the delivery delay of the uplink data packet, the data packet may include one or more of an SDAP SDU, an SDAP PDU, a PDCP SDU, a PDCP PDU, an RLC SDU, an RLC PDU, an MAC SDU and an MAC PDU. When the delay of the data packet includes the reordering delay of the downlink data packet at the PDCP layer, the data packet may include one or more of a PDCP SDU, a PDCP PDU and an RLC SDU.

In a possible embodiment of the present disclosure, the downlink data packets for the calculation of the proportion may include: a downlink data packet among the downlink data packets which have been received repeatedly within the time period; or the downlink data packets received within the time period and located in the reordering window, and the uplink data packets located within the reordering window but ignored due to the expiration of the reordering timer at the PDCP layer. A reordering delay of the ignored uplink data packet may be a time value of the reordering timer, and the reordering window may be a data packet sequence window.

In a possible embodiment of the present disclosure, the uplink data packets for the calculation of the proportion may include an uplink data packet with a shortest delivery delay among the uplink data packets which have been received repeatedly within the time period.

Figure 12:
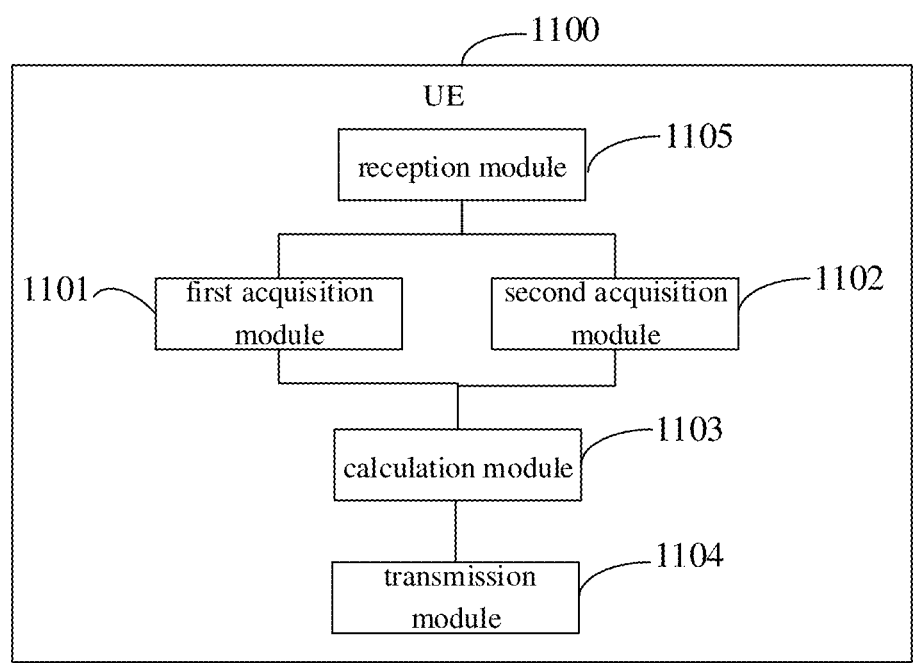
FIG. 12 is another schematic view showing the UE according to one embodiment of the present disclosure.

In a possible embodiment of the present disclosure, as shown in FIG. 12, the UE 1100 may further include a reception module 1105 configured to receive configuration information for calculating the delay of each data packet from the base station. The configuration information may include one or more of a measurement item identifier, a to-be-measured object identifier, and a report trigger configuration.

In a possible embodiment of the present disclosure, the measurement item identifier may include a measurement item identifier for the delivery delay of each uplink data packet or a measurement item identifier for the reordering delay of each downlink data packet at the PDCP layer. The to-be-measured object identifier may include one or more a QoS flow identifier, a split bearer path identifier, a duplicate bearer path identifier, a bearer type identifier and a cell group identifier.

In a possible embodiment of the present disclosure, the report trigger configuration may include a predetermined delay threshold, a predetermined proportion threshold, a predetermined reporting condition, and a period of a periodical reporting operation.

In a possible embodiment of the present disclosure, the transmission module 1104 is further configured to transmit the calculated proportion to the base station when the report trigger condition has been met based on the configuration information.

In a possible embodiment of the present disclosure, the transmission module 1104 is further configured to transmit the calculated proportion and the corresponding to-be-measured object identifier to the base station when the report trigger condition has been met based on the configuration information.

The UE in the embodiments of the present disclosure is capable of implementing the procedures for the base station in FIGS. 2-5, which will not be particularly defined herein. According to the UE in the embodiments of the present disclosure, it is able to improve the performance of the communication system, and further reduce the delivery delay of the data packets in the network.

Figure 13:
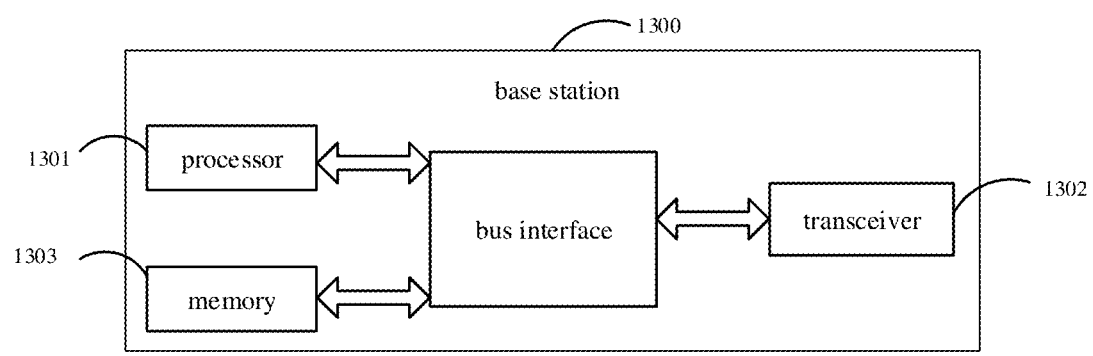
FIG. 13 is another schematic view showing the base station according to one embodiment of the present disclosure.

The present disclosure further provides in some embodiments a base station 1300 which, as shown in FIG. 13, includes a processor 1301, a transceiver 1302, a memory 1303 and a bus interface. The processor 1301 is configured to: acquire an arrival time of each data packet, the arrival time including a time when the data packet arrives at an SDAP layer, a time when the data packet arrives at a PDCP layer, a time when the data packet arrives at the PDCP layer and is placed into a reordering window, a time when the data packet arrives at an RLC layer, or a time when the data packet arrives at an MAC layer; acquire a delivery time or a reception time of each data packet, the delivery time being a time when the data packet is transmitted from the PDCP layer to a high-layer protocol entity, and the reception time being a time when the data packet has been received successfully; calculate an average delay of downlink data packets within a certain time period or a proportion of uplink data packets whose reordering delay at the PDCP layer is greater than or smaller than a predetermined delay threshold within a certain time period based on the arrival time and the delivery time or the reception time, the average delay of the downlink data packets including one or more of the average delay of the downlink data packets received within a certain time period by a same UE, of a same bearer type, in a same transmission path, on a same RB, and in a same QoS flow; and perform radio resource configuration based on the calculated average delay or proportion.

In a possible embodiment of the present disclosure, the downlink data packet may include one or more of an SDAP SDU, a SDAP PDU, a PDCP SDU, a PDCP PDU, an RLC SDU, an RLC PDU, an MAC SDU and an MAC PDU, and the uplink data packet may include one or more of a PDCP SDU, a PDCP PDU and an RLC SDU.

In a possible embodiment of the present disclosure, the time when the data packet has been received successfully may include a time when an RLC feedback of the data packet has been received successfully or a time when a PDCP feedback of the data packet has been received successfully.

In a possible embodiment of the present disclosure, the uplink data packets for the calculation of the proportion may include all uplink data packets received within the time period, uplink data packets for a same UE, uplink data packets with a same QCI, uplink data packets on a same bearer, uplink data packets in a same QoS flow, uplink data packets on a same RB and in a same path, uplink data packets in a same cell group, or uplink data packets of a same bearer type.

In a possible embodiment of the present disclosure, the uplink data packets for the calculation of the proportion may include: an uplink data packet among the uplink data packets which have been received repeatedly within the time period; or the uplink data packets received within the time period and located in the reordering window, and the uplink data packets located within the reordering window but ignored due to the expiration of the reordering timer at the PDCP layer. A reordering delay of the ignored uplink data packet may be a time value of the reordering timer, and the reordering window may be a data packet sequence window.

According to the base station in the embodiments of the present disclosure, it is able to improve the performance of the communication system, thereby to further reduce the delivery delay of the data packets in the network.

The transceiver 1302 is configured to receive and transmit data under the control of the processor 1301, and it may include at least two antenna ports.

In FIG. 13, bus architecture may include a number of buses and bridges connected to each other, so as to connect various circuits for one or more processors 1301 and one or more memories 1303. In addition, as is known in the art, the bus architecture may be used to connect any other circuits, such as a circuit for a peripheral device, a circuit for a voltage stabilizer and a power management circuit. The bus interface may be provided, and the transceiver 1302 may consist of a plurality of elements, i.e., a transmitter and a receiver for communication with any other devices over a transmission medium. With respect to different UEs, a user interface 1304 may also be provided for devices which are to be arranged inside or outside the UE, and these devices may include but not limited to a keypad, a display, a speaker, a microphone and a joystick. The processor 1301 may take charge of managing the bus architecture as well as general processings. The memory 1303 may store therein data for the operation of the processor 1301.

The present disclosure further provides in some embodiments a base station which includes a processor 1301, a memory 1303, and a computer program stored in the memory 1303 and executed by the processor 1301. The computer program is executed by the processor 1301 so as to implement the above-mentioned radio resource configuration method with a same technical effect, which will not be particularly defined herein.

Figure 14:
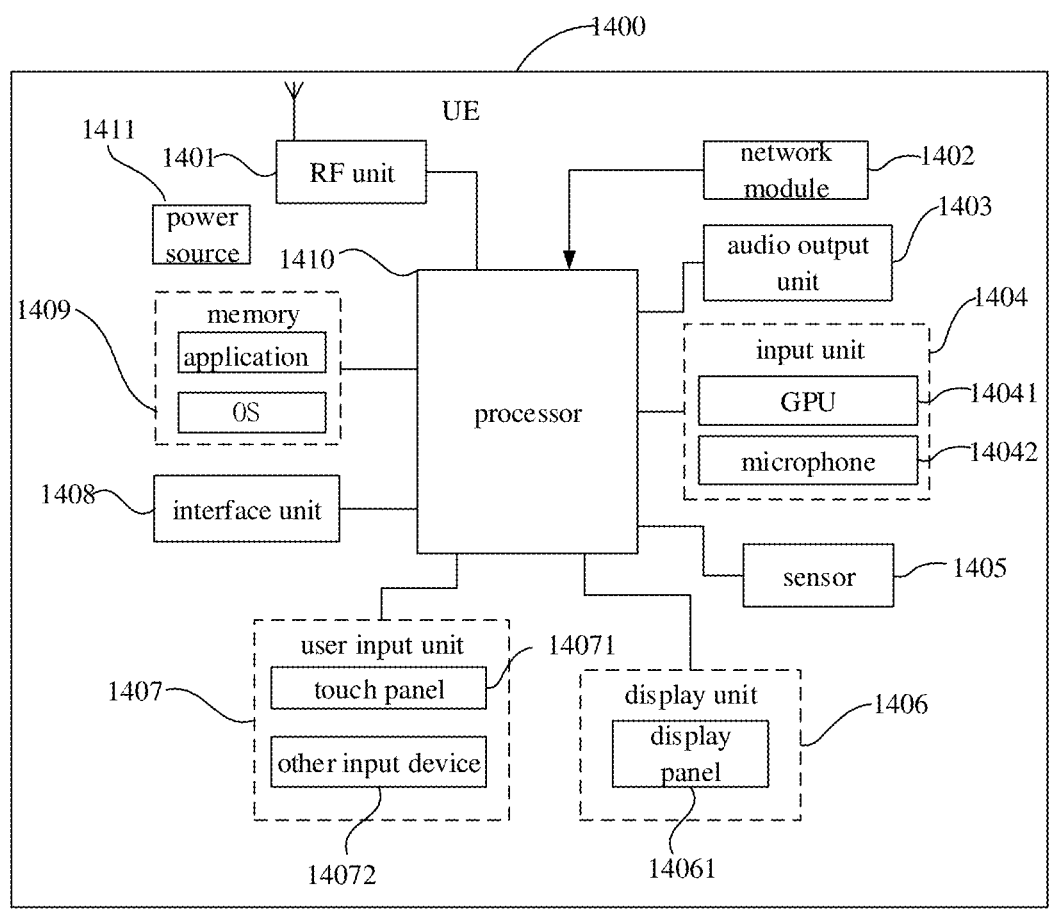
FIG. 14 is yet another schematic view showing the UE according to one embodiment of the present disclosure.

The present disclosure further provides in some embodiments a UE 1400 which, as shown in FIG. 14, includes, but not limited to a Radio Frequency (RF) unit 1401, a network module 1402, an audio output unit 1403, an input unit 1404, a sensor 1405, a display unit 1406, a user input unit 1407, an interface unit 1408, a memory 1409, a processor 1410, and a power source 1411. It should be appreciated that, the structure in FIG. 14 shall not be construed as limiting the UE. The UE may include more or fewer members, or some members may be combined, or the UE may include some other members not shown in FIG. 14. In the embodiments of the present disclosure, the UE may include, but not limited to, mobile phone, flat-panel computer, laptop computer, Personal Digital Assistant (PDA), vehicle-mounted terminal, wearable device or pedometer.

The processor 1401 is configured to: acquire the arrival time of each data packet, the arrival time including a time when the data packet arrives at an SDAP layer, a time when the data packet arrives at a PDCP layer, a time when the data packet arrives at a PDCP layer and is placed into a reordering window, a time the data packet arrives at an RLC layer, or a time when the data packet arrives at an MAC layer; acquire a delivery time of each data packet, the delivery time being a time when the data packet is transmitted from the PDCP layer to a high-layer protocol entity, a time when the data packet is transmitted to a physical layer PHY, a time when the data packet is transmitted through an air interface, or a time when a feedback of the data packet has been received successfully, the feedback being used to indicate that a base station has received the data packet successfully; and calculate a proportion of data packets whose delay is greater than or smaller than a predetermined delay threshold within a certain time period based on the arrival time and the delivery time, the delay of the data packets including a reordering delay of downlink data packets at the PDCP layer or a delivery delay of uplink data packets, the proportion including one or more of a proportion in data packets for the UE, a proportion in data packets on a same RB, a proportion in data packets in a same QoS flow, a proportion in data packets received on a same split bearer and in a same path, a proportion in data packets received on a same duplicate bearer and in a same path, a proportion in data packets in a same cell group, and a proportion in data packets of a same bearer type. The RF unit 1401 is configured to transmit the calculated proportion to the base station, so that the base station performs the radio resource configuration based on the proportion.

In a possible embodiment of the present disclosure, when the delay of the data packet includes the delivery delay of the uplink data packet, the data packet may include one or more of an SDAP SDU, an SDAP PDU, a PDCP SDU, a PDCP PDU, an RLC SDU, an RLC PDU, an MAC SDU and an MAC PDU. When the delay of the data packet includes the reordering delay of the downlink data packet at the PDCP layer, the data packet may include one or more of a PDCP SDU, a PDCP PDU and an RLC SDU.

In a possible embodiment of the present disclosure, the downlink data packets for the calculation of the proportion may include: a downlink data packet among the downlink data packets which have been received repeatedly within the time period; or the downlink data packets received within the time period and located in the reordering window, and the uplink data packets located within the reordering window but ignored due to the expiration of the reordering timer at the PDCP layer. A reordering delay of the ignored uplink data packet may be a time value of the reordering timer, and the reordering window may be a data packet sequence window.

In a possible embodiment of the present disclosure, the uplink data packets for the calculation of the proportion may include an uplink data packet with a shortest delivery delay among the uplink data packets which have been received repeatedly within the time period.

In a possible embodiment of the present disclosure, the RF unit 1401 is further configured to receive configuration information for calculating the delay of each data packet from the base station. The configuration information may include one or more of a measurement item identifier, a to-be-measured object identifier, and a report trigger configuration.

In a possible embodiment of the present disclosure, the measurement item identifier may include a measurement item identifier for the delivery delay of each uplink data packet or a measurement item identifier for the reordering delay of each downlink data packet at the PDCP layer. The to-be-measured object identifier may include one or more a QoS flow identifier, a split bearer path identifier, a duplicate bearer path identifier, a bearer type identifier and a cell group identifier.

In a possible embodiment of the present disclosure, the report trigger configuration may include a predetermined delay threshold, a predetermined proportion threshold, a predetermined reporting condition, and a period of a periodical reporting operation.

In a possible embodiment of the present disclosure, the RF unit 1401 is further configured to transmit the calculated proportion to the base station when the report trigger condition has been met based on the configuration information.

In a possible embodiment of the present disclosure, the RF unit 1401 is further configured to transmit the calculated proportion and the corresponding to-be-measured object identifier to the base station when the report trigger condition has been met based on the configuration information.

According to the UE in the embodiments of the present disclosure, it is able to improve the performance of the communication system, and further reduce the delivery delay of the data packets in the network.

It should be appreciated that, in the embodiments of the present disclosure, the RF unit 1401 is configured to transmit and receive signals during the information transmission or phone call. To be specific, the RF unit 1401 may, upon the receipt of the downlink data from the base station, transmit the downlink data to the processor 1410 for subsequent treatment. In addition, the RF unit 1401 may transmit uplink data to the base station. Usually, the RF unit 1401 may include, but not limited to, an antenna, at least one amplifier, a transceiver, a coupler, a low-noise amplifier and a duplexer. In addition, the RF unit 1401 may communicate with a network and the other devices via a wireless communication system.

The network module 1402 is configured to enable the UE to access the broadband Internet in a wireless manner, e.g., help a user to receive and send an e-mail, browse a web page or access a streaming media.

The audio output unit 1403 is configured to convert audio data received by the RF unit 1401 or the network module 1402, or audio data stored in the memory 1409, into an audio signal and output the audio signal as a sound. In addition, the audio output unit 1403 is further configured to provide an audio output related to a specific function executed by the UE 1400 (e.g., a sound occurring when a calling signal or a message has been received). The audio output unit 1403 may include a loudspeaker, a buzzer and a receiver.

The input unit 1404 is configured to receive an audio or video signal. It may include a Graphics Processing Unit (GPU) 14041 and a microphone 14042. The GPU 14041 is configured to process image data of a static image or video acquired by an image collection unit (e.g., a camera) in a video capturing mode or an image capturing mode, and a processed image frame may be displayed by the display unit 1406. The image frame processed by the GPU 14041 may be stored in the memory 1409 (or any other storage medium) or transmitted via the RF unit 1401 or network module 1402. The microphone 14042 is configured to receive a sound, and convert the sound into voice data. In a call mode, the processed audio data may be converted into data in a format capable of being transmitted by the RF unit 1401 to a mobile communication base station.

The at least one sensor 1405 of the UE 1400 may include a light sensor, a movement sensor and the other sensors. To be specific, the light sensor may include an ambient light sensor or a proximity sensor. The ambient light sensor is configured to adjust a brightness value of a display panel 14061 based on ambient light. The proximity sensor is configured to turn off the display panel 14061 and/or a backlight source when the UE 1400 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the UE (e.g., perform a switching operation between portrait and landscape orientations, play relevant games, and calibrate a posture of a magnetometer), and perform vibration-related functions (e.g., count steps and strikes). The sensor 1405 may further include a fingerprint sensor, a pressure sensor, an iris sensor, a molecule sensor, a gyroscope, a barometer, a hygrometer, a thermometer or an infrared sensor, which will not be particularly defined herein.

The display unit 1406 is configured to display information inputted by the user or provided to the user. The display unit 1406 may include the display panel 14061, e.g., a Liquid Crystal Display (LCD) panel, or an Organic Light-Emitting Diode (OLED) panel.

The user input unit 1407 is configured to receive digital or character information inputted by the user, and generate a key signal input related to user settings and function control of the UE. To be specific, the user input unit 1407 may include a touch panel 14071 and an input device 14072. The touch panel 14071, also called as touch screen, is configured to collect a touch operation made by the user on or in proximity to the touch panel (e.g., an operation made by the user through any appropriate object or attachment (e.g., finger or stylus) on or in the proximity to the touch panel 14071). The touch panel 14071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1410, and receive and execute a command from the processor 1410. In addition, the touch panel 14071 may be of a resistive type, a capacitive type, an infrared type or a surface acoustic wave (SAW) type. The other input device 14072 may include, but not limited to, a physical keyboard, a functional button (e.g., a volume control button or an on/off button), a trackball, a mouse, and a joystick, which will not be particularly defined herein.

Further, the touch panel 14071 may cover the display panel 14061. When the touch operation made on or in proximity to the touch panel 14071 has been detected, the touch panel 14071 may transmit the touch information to the processor 1410, so as to determine a type of a touch event. Then, the processor 1410 may control the display panel 14061 to provide a corresponding visual output based on the type of the touch event. Although the touch panel 14071 and the display panel 14061 are configured as two separate members in FIG. 14, in some embodiments of the present disclosure, they may be integrated so as to achieve the input and output functions of the electronic device, which will not be particularly defined herein.

The interface unit 1408 is configured to provide an interface between an external device and the UE 1400. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 1408 is configured to receive an input from the external device (e.g., data information and electricity) and transmit the input to one or more elements of the UE 1400, or transmit data between the UE 1400 and the external device.

The memory 1409 is configured to store therein a software application and various data. It may mainly include an application storage area and a data storage area. An operating system and at least one application for the functions (e.g., an audio/image playing function) may be stored in the application storage area. Data created based on the operation of the mobile phone (e.g., audio data and textbook) may be stored in the data storage area. In addition, the memory 1409 may include a high-speed random access memory (RAM), or a non-volatile memory (e.g., at least one magnetic disk or flash memory), or any other volatile solid state memory.

As a control center of the electronic device, the processor 1410 may be connected to the other members of the electronic device via various interfaces and circuits, and configured to run or execute the software program and/or module stored in the memory 1409, and call the data stored in the memory 1409, so as to execute the functions of the electronic device and process the data, thereby to monitor the entire electronic device. The processor 1410 may include one or more processing units. In a possible embodiment of the present disclosure, an application processor and a modem may be integrated into the processor 1410. The application processor is mainly configured to process the operating system, a user interface and the application. The modem is mainly configured to process wireless communication. It should be appreciated that, the modem may also not be integrated into the processor 1410.

The power source 1411 (e.g., a battery) is configured to supply power to the members of the UE 1400. In a possible embodiment of the present disclosure, the power source 1411 is logically connected to the processor 1410 via a power source management system, so as to achieve such functions as charging, discharging and power consumption management through the power source management system.

In addition, the UE 1400 may include some functional modules not shown in FIG. 14, which will not be particularly defined herein.

The present disclosure further provides in some embodiments a UE, which includes a processor 1410, a memory 1409, and a computer program stored in the memory 1409 and executed by the processor 1410. The computer program is executed by the processor 1410 so as to implement the above-mentioned radio resource configuration method with a same technical effect, which will not be particularly defined herein.

The present disclosure further provides in some embodiments a computer-readable storage medium storing therein a computer program. The computer program is executed by a processor so as to implement the above-mentioned radio resource configuration method for the base station with a same technical effect, which will not be particularly defined herein. The computer-readable storage medium may be an ROM, an RAM, a magnetic disk or an optical disk.

It should be appreciated that, in the context, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A radio resource configuration method applied for a base station, comprising:

acquiring an arrival time, the arrival time being a time when the uplink data packet arrives at the PDCP layer of the base station from a radio link control (RLC) layer of the base station and is placed into a reordering window;

acquiring a delivery time, the delivery time being a time when the uplink data packet is transmitted from the PDCP layer of the base station to a high-layer protocol entity;

calculating, based on the arrival time and the delivery time, a proportion of uplink data packets whose reordering delay at the PDCP layer of the base station is greater than a predetermined delay threshold within a certain time period; and performing radio resource configuration based on the calculated proportions;

wherein the uplink data packets for the calculation of the proportion comprise:

the uplink data packets received within the time period and located in the reordering window, and the uplink data packets located within the reordering window but ignored due to the expiration of the reordering timer at the PDCP layer, wherein a reordering delay of the ignored uplink data packet is a time value of the reordering timer, and the reordering window is a data packet sequence window.

2. The radio resource configuration method according to claim 1, wherein the uplink data packet comprises one or more of a PDCP SDU, a PDCP PDU and an RLC SDU.

3. The radio resource configuration method according to claim 1, wherein the uplink data packets for the calculation of the proportion comprises all uplink data packets received within the time period, uplink data packets for a same UE, uplink data packets with a same QoS Class Identifier (QCI), uplink data packets on a same bearer, uplink data packets in a same QoS flow, uplink data packets on a same RB and through a same path, uplink data packets in a same cell group, or uplink data packets of a same bearer type.

4. A base station, comprising a memory, a processor, and a computer program stored in the memory and executed by the processor, wherein the processor is configured to execute the computer program so as to implement the radio resource configuration method according to claim 1.

5. The base station according to claim 4, wherein the uplink data packet comprises one or more of a PDCP SDU, a PDCP PDU and an RLC SDU.

6. A non-transitory computer-readable storage medium storing therein a computer program, wherein the computer program is executed by a processor so as to implement the radio resource configuration method according to claim 1.

7. A radio resource configuration method applied for a UE, comprising:

acquiring an arrival time, the arrival time being a time when the downlink data packet arrives at the PDCP layer of the UE from an RLC layer of the UE and is placed into a reordering window;

acquiring a delivery time, the delivery time being a time when the downlink data packet is transmitted from the PDCP layer of the UE to a high-layer protocol entity;

calculating, based on the arrival time and the delivery time, a proportion of data packets whose delay is greater than a predetermined delay threshold within a certain time period, the delay of the data packets being a reordering delay of downlink data packets at the PDCP layer of the UE, the proportion comprising one or more of a proportion in data packets for the UE, a proportion in data packets on a same RB, a proportion in data packets in a same QoS flow, a proportion in data packets received on a same split bearer and through a same path, a proportion in data packets received on a same duplicate bearer and through a same path, a proportion in data packets in a same cell group, and a proportion in data packets of a same bearer type; and transmitting the calculated proportion to a base station, so that the base station performs the radio resource configuration based on the proportion;

wherein the downlink data packets for the calculation of the proportion comprise:

the downlink data packets received within the time period and located in the reordering window, and the downlink data packets located within the reordering window but ignored due to the expiration of the reordering timer at the PDCP layer, wherein a reordering delay of the ignored downlink data packet is a time value of the reordering timer, and the reordering window is a data packet sequence window.

8. The radio resource configuration method according to claim 7, wherein the data packet comprises one or more of a PDCP SDU, a PDCP PDU and an RLC SDU.

9. The radio resource configuration method according to claim 7, wherein prior to acquiring the arrival time of the data packet, the radio resource configuration method further comprises receiving configuration information for calculating the delay of each data packet from the base station, wherein the configuration information comprises one or more of a measurement item identifier, a to-be-measured object identifier, and a report trigger configuration.

10. The radio resource configuration method according to claim 9, wherein the measurement item identifier comprises a measurement item identifier for the reordering delay of each downlink data packet at the PDCP layer, and the to-be-measured object identifier comprises one or more of a QoS flow identifier, a split bearer path identifier, a duplicate bearer path identifier, a bearer type identifier and a cell group identifier.

11. The radio resource configuration method according to claim 9, wherein the report trigger configuration comprises one or more of a predetermined delay threshold, a predetermined proportion threshold, a predetermined reporting condition, and a period of a periodical reporting operation.

12. The radio resource configuration method according to claim 9, wherein the transmitting the calculated proportion to the base station comprises transmitting the calculated proportion to the base station when the report trigger condition has been met based on the configuration information.

13. The radio resource configuration method according to claim 12, wherein the transmitting the calculated proportion to the base station comprises transmitting the calculated proportion and the corresponding to-be-measured object identifier to the base station.

14. A UE, comprising a memory, a processor, and a computer program stored in the memory and executed by the processor, wherein the processor is configured to execute the computer program so as to implement the radio resource configuration method according to claim 7.

15. The UE according to claim 14, wherein the data packet comprises one or more of a PDCP SDU, a PDCP PDU and an RLC SDU.

16. A non-transitory computer-readable storage medium storing therein a computer program, wherein the computer program is executed by a processor so as to implement the radio resource configuration method according to claim 6.

* * * * *